(12) United States Patent
Liu

(10) Patent No.: US 6,519,060 B1
(45) Date of Patent: *Feb. 11, 2003

(54) SYNCHRONOUS OPTICAL NETWORK IN FREQUENCY DOMAIN

(75) Inventor: Jian-Yu Liu, Garland, TX (US)

(73) Assignee: Chorum Technologies LP, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/326,201

(22) Filed: Jun. 4, 1999

(51) Int. Cl.⁷ .................................................. H04J 14/02
(52) U.S. Cl. ....................................................... 359/127
(58) Field of Search ................................. 359/122, 124, 359/127, 130, 128

(56) References Cited

U.S. PATENT DOCUMENTS

| | | | |
|---|---|---|---|
| 3,391,970 A | 7/1968 | Sincerbox | 350/150 |
| 3,500,102 A | 3/1970 | Crost et al. | 313/109 |
| 3,501,640 A | 3/1970 | Harris | 250/199 |
| 3,503,670 A | 3/1970 | Kosanke et al. | 350/150 |
| 3,719,414 A | 3/1973 | Wentz | 350/150 |
| 3,892,468 A | 7/1975 | Duguay | 350/96 B |
| 3,920,983 A | 11/1975 | Schlafer et al. | 250/199 |
| 4,129,357 A | 12/1978 | Title | 350/157 |
| 4,227,208 A | 10/1980 | Takanashi et al. | 358/55 |
| 4,359,268 A | 11/1982 | Kondo | 350/377 |
| 4,461,543 A | 7/1984 | McMahon | 350/383 |
| 4,464,022 A | 8/1984 | Emkey | 350/377 |

(List continued on next page.)

FOREIGN PATENT DOCUMENTS

| | | | |
|---|---|---|---|
| EP | 0307244 | 3/1989 | G02F/1/31 |
| EP | 0370410 | 5/1990 | G02B/5/30 |
| EP | 0 905 936 | 3/1999 | H04J/14/02 |
| JP | 61-097629 | 5/1986 | G02F/1/31 |
| JP | 01-140134 | 6/1989 | G02F/1/31 |
| JP | 02-007026 | 1/1990 | G02F/1/31 |
| JP | 03-276119 | 12/1991 | G02B/27/28 |
| JP | 04-128715 | 4/1992 | G02F/1/09 |
| JP | 06-181352 | 6/1994 | H01S/3/094 |
| WO | WO 98/04056 | 1/1998 | H04B/10/00 |
| WO | WO 98/19415 | 5/1998 | H04J/14/00 |
| WO | 98/47254 | * 10/1998 | |
| WO | WO 98 47254 | 10/1998 | H04J/14/02 |
| WO | WO 99/08403 | 2/1999 | H04B/10/00 |
| WO | WO 99/33289 | 7/1999 | H04Q/7/20 |

OTHER PUBLICATIONS

Sakano et al., "Turnover–Type Free–Space Multichannel Optical Switch," OSA Proceedings on Photonics in Switching, Mar. 15, 1993, vol. 16.

Toba, et al.; "An Optical FDM–Based Self–Healing Ring Network Employing Arrayed Waveguide Granting Filters and EDFA's with Level Equalizers," IEEE Journal, vol.: 14. No. 5, pp. 800–813, Jun. 1996.

(List continued on next page.)

*Primary Examiner*—Leslie Pascal
(74) *Attorney, Agent, or Firm*—Baker Botts L.L.P.

(57) ABSTRACT

An optical wavelength add/drop multiplexer provides communications between two optical links supporting wavelength division multiplexing (WDM). A wavelength slicer spatially separates the input signal into two sets of channels. An optical filter, such as an interference filter, spatially separates the a subset of the input channels into an array of separated channels. A programmable optical add/drop switch array selectively routes channels from and array of input ports to an array of drop ports, substitutes channels from an array of add ports in place of the dropped channels, and routes the remaining input channels and added channels to an array of output ports. The channels from the output ports of the said add/drop switch array are then combined and transmitted into the second optical link. In an alternative embodiment, a circulated drop filter consisting of an optical circulator and a series of filter Bragg gratings is used to select a predetermined series of input channels to be processed by the add/drop switch array, with the remaining channels being passed by the circulated drop filter as express lanes.

80 Claims, 11 Drawing Sheets

U.S. PATENT DOCUMENTS

| | | | |
|---|---|---|---|
| 4,514,046 A | 4/1985 | Carlsen et al. | 350/385 |
| 4,566,761 A | 1/1986 | Carlsen et al. | 350/401 |
| 4,575,193 A | 3/1986 | Greivenkamp, Jr. | 350/401 |
| 4,626,897 A | 12/1986 | Sato et al. | 358/44 |
| 4,650,289 A | 3/1987 | Kuwahara | 350/375 |
| 4,671,613 A | 6/1987 | Buhrer | 350/174 |
| 4,678,287 A | 7/1987 | Buhrer | 350/404 |
| 4,685,773 A | 8/1987 | Carlsen et al. | 350/401 |
| 4,744,075 A | 5/1988 | Buhrer | 370/3 |
| 4,745,591 A | 5/1988 | Foley | 370/3 |
| 4,772,104 A | 9/1988 | Buhrer | 350/403 |
| 4,919,522 A | 4/1990 | Nelson | 350/389 |
| 4,987,567 A | 1/1991 | Buhrer | 370/3 |
| 5,009,477 A | 4/1991 | Alferness et al. | 350/96.15 |
| 5,033,830 A | 7/1991 | Jameson | 350/403 |
| 5,040,896 A | 8/1991 | Moslehi | 356/351 |
| 5,111,321 A | 5/1992 | Patel | 359/92 |
| 5,204,771 A | 4/1993 | Koga | 359/281 |
| 5,231,521 A | 7/1993 | Johnson et al. | 359/93 |
| 5,243,455 A | 9/1993 | Johnson et al. | 359/93 |
| 5,262,892 A | 11/1993 | Nakamura | 359/484 |
| 5,274,679 A | 12/1993 | Abe et al. | 375/117 |
| 5,299,056 A | 3/1994 | Kurata et al. | 359/341 |
| 5,317,655 A | 5/1994 | Pan | 385/11 |
| 5,319,483 A | 6/1994 | Krasinski et al. | 359/113 |
| 5,341,444 A | 8/1994 | Henry et al. | 385/11 |
| 5,345,174 A | 9/1994 | Kimmich et al. | 324/309 |
| 5,351,317 A | 9/1994 | Weber | 385/3 |
| 5,355,249 A | 10/1994 | Souda et al. | 359/341 |
| 5,414,540 A | 5/1995 | Patel et al. | 359/39 |
| 5,444,725 A | 8/1995 | Zirngibl | 372/20 |
| 5,463,493 A | 10/1995 | Shah | 359/312 |
| 5,481,402 A | 1/1996 | Cheng et al. | 359/498 |
| 5,499,132 A | 3/1996 | Tojo et al. | 359/281 |
| 5,574,596 A | 11/1996 | Cheng | 359/484 |
| 5,579,420 A | 11/1996 | Fukushima | 358/11 |
| 5,596,661 A | 1/1997 | Henry et al. | 385/24 |
| 5,600,742 A | 2/1997 | Zirngibl | 385/37 |
| 5,612,805 A * | 3/1997 | Fevrier et al. | 359/128 |
| 5,619,359 A | 4/1997 | Redmond et al. | 359/117 |
| 5,680,490 A * | 10/1997 | Cohen et al. | 385/24 |
| 5,694,233 A * | 12/1997 | Wu et al. | 359/117 |
| 5,710,655 A | 1/1998 | Rumbaugh et al. | 359/249 |
| 5,710,846 A | 1/1998 | Wayman et al. | 385/17 |
| 5,718,226 A | 2/1998 | Riza | 128/660.01 |
| 5,724,165 A | 3/1998 | Wu | 359/117 |
| 5,729,377 A | 3/1998 | Bergmann | 359/249 |
| 5,751,384 A | 5/1998 | Sharp | 349/18 |
| 5,751,454 A * | 5/1998 | MacDonald | 359/119 |
| 5,771,120 A | 6/1998 | Bergmann | 359/484 |
| 5,778,118 A * | 7/1998 | Sridhar | 359/130 |
| 5,781,293 A | 7/1998 | Padgett et al. | 356/346 |
| 5,809,190 A | 9/1998 | Chen | 385/43 |
| 5,852,505 A * | 12/1998 | Li | 359/127 |
| 5,867,289 A | 2/1999 | Gerstel et al. | 359/110 |
| 5,867,291 A | 2/1999 | We et al. | 359/124 |
| 5,912,748 A * | 6/1999 | Wu et al. | 359/117 |
| 5,923,472 A | 7/1999 | Bergmann | 359/618 |
| 5,930,028 A | 7/1999 | Bergmann | 359/303 |
| 5,930,039 A | 7/1999 | Li et al. | 359/484 |
| 6,002,512 A | 12/1999 | Bergmann et al. | 359/281 |
| 6,005,697 A * | 12/1999 | Wu et al. | 359/117 |
| 6,040,942 A | 3/2000 | Bergmann | 359/487 |
| 6,055,101 A | 4/2000 | Bergmann et al. | 359/484 |
| 6,067,178 A | 5/2000 | Zheng | 359/124 |
| 6,091,543 A | 7/2000 | Bergmann | 359/495 |
| 6,097,517 A | 8/2000 | Okayama | 359/124 |
| 6,097,518 A * | 8/2000 | Wu et al. | 359/127 |
| 6,115,155 A * | 9/2000 | Wu et al. | 359/127 |
| 6,125,221 A | 9/2000 | Bergmann et al. | 385/33 |
| 6,130,971 A | 10/2000 | Cao | 385/31 |
| 6,134,031 A | 10/2000 | Nishi et al. | 359/15 |
| 6,137,606 A * | 10/2000 | Wu et al. | 359/124 |
| 6,173,092 B1 | 1/2001 | Bergmann | 385/16 |
| 6,175,432 B1 * | 1/2001 | Wu et al. | 359/124 |
| 6,288,807 B1 * | 9/2001 | Wu et al. | 359/122 |

OTHER PUBLICATIONS

Koga, et al., "Performances of an Optical Path Cross–Connect System and its Wavelength Monitoring Cirucit," IEEE Journal, pp. 1771–1777, Jun. 23, 1996.

International Search Report, Form PCT/ISA/210, Dec. 15, 2000.

Wavelength–Division Multiplexer/DeMultiplexer, by P. Melman et al., May 23, 1985.

Flat Passband Birefringent Wavelength–Division Multiplexers, by W. J. Carlsen et al., Nov. 25, 1986.

Wavelength–Division Multi/Demultiplexer Utilizing Optically Active Crystals, by Yohji Fujii et al., Journal of Lightwave Technology, vol. 8, No. 7, Jul. 1990.

Fiber–Optic Communication in the Wavelength–Division Multiplex Mode by H. F. Mahlein, Fiber and Integrated Optics, vol. 4.

Review and Status of Wavelength–Division–Multiplexing Technology and Its Application by Hideki Ishio et al., Journal of Lightwave.

Devices for Wavelength Multiplexing and DeMultiplexing by J.M. Senior, et al., IEEE Proceedings, vol. 136, Pt. J, No. 3, Jun. 1989.

International Search Report dated Sep. 26, 2000 (PCT/US00/15431).

Jian–Yu Liu et al., "Digitally Programmable Wavelength–Switching Technology," 1997 Digest of the IEEE/LEOS Summer Topical Meetings, pp. 9–10 (XP002147450).

Properties of a Novel Noncascaded Type, Easy–to–Design, Ripple–Free Optical Bandpass Filter—Benjamin Dingel, Journal of Lightwave Technology, vol. 17, No. 8, Aug. 1999.

Efficient Architectures for Exactly Realizing Optical Filters with Optimum Bandpass Designs—C. K. Madsen, IEEE Photonics Technology Letters, vol. 10, No. 8, Aug. 1998.

*Analysis of a Tunable Multichannel Two–Mode–Interference Wavelength Division Multiplexer/DeMultiplexer*—Youngchul Chung, Jong Chang Yi, Sun Ho Kim, and Sang Sam Choi; Jornal of Lightwave Technology, vol. 7, No. 5, May 1998.

*Optical FDM Transmission Technique*—Kiyoshi Nosu, Hiromu Toba, and Katsushi Iwashita; Jornal of lightwave Technology, vol. LT–5, No. 9, Sep. 1987.

*A Four–Channel Optical Waveguide Multi/Demultiplexer for 5–Ghz Spaced Optical FDM Transmission*—Kyo Inoue, Norio Takato, Hiromu Toba, and Masao Kawachi; Journal of Lightwave Technology, vol. 6, No. 2, Feb. 1988.

* cited by examiner

OPTICAL SLICING

| 1 | OS-25 | 200*2.5 Gbps |
|---|---|---|
| 2 | OS-50 | 100*2.5 Gbps |
| 4 | OS-100 | 50*2.5 Gbps |
| 8 | OS-200 | 25*2.5 Gbps |

ASSUMING EDFA 40 nm BAND

SONET

| 1 | OC-192 | 10 Gbps |
|---|---|---|
| 4 | OC-48 | 2.5 Gbps |
| 16 | OC-12 | 622 Mbps |
| 64 | OC-3 | 155 Mbps |

SYNCHRONOUS OPTICAL NETWORK IN FREQUENCY DOMAIN

RELATED APPLICATIONS

The present application is a continuation-in-part of the Applicant's U.S. Pat. No. 5,694,233, entitled "SWITCHABLE WAVELENGTH ROUTER," filed on Jan. 8, 1997, which is hereby incorporated herein by reference; and U.S. patent application Ser. No. 09/273,920, entitled "OPTICAL WAVELENGTH ADD/DROP MULTIPLEXER," filed on Mar. 22, 1999, which is hereby incorporated herein by reference, and is related to Applicant's U.S. Pat. No. 5,115,155, entitled "SYSTEM FOR DEALING WITH FAULTS IN AN OPTICAL LINK," filed on Nov. 12, 1998, which is hereby incorporated herein by reference; Applicant's U.S. Pat. No. 6,160,665, entitled "HIGH EXTINCTION RATIO POLARIZATION BEAMSPLITTER," which is hereby incorporated by reference; Applicant's U.S. patent application Ser. No. 09/326,250, entitled "N×M DIGITALLY PROGRAMMABLE OPTICAL ROUTING SWITCH USING HIGH EXTINCTION RATIO POLARIZATION BEAMSPLITTER," which is hereby incorporated herein by reference; Applicant's U.S. patent application Ser. No. 09/326,251, entitled "FIBER OPTIC SMART SWITCH," which is hereby incorporated herein by reference; Applicant's U.S. patent application Ser. No. 09/326,256, entitled "OPTICAL ADD/DROP WAVELENGTH SWITCH USING A HIGH EXTINCTION RATIO POLARIZATION BEAMSPLITTER," which is hereby incorporated herein by reference.

TECHNICAL FIELD

The present application relates in general to optical communications, and more particularly to using a wavelength slicer for wavelength division multiplex communications.

BACKGROUND

Optical wavelength division multiplexing has gradually become the standard backbone network for fiber optical communication systems. WDM systems employ signals consisting of a number of different wavelength optical signals, known as carrier signals or channels, to transmit information over optical fibers. Each carrier signal is modulated by one or more information signals. As a result, a significant number of information signals may be transmitted over a single optical fiber using WDM technology. These optical signals are repeatedly amplified by erbium-doped fiber amplifiers (EDFA) along the network to compensate for transmission losses. The amplified signals reach the receiving end and are detected using WDM filters followed by photo receivers.

Fiber optic communications networks are typically arranged with a plurality of terminals in any of a number of topological configurations. The simplest configuration is two terminals communicating data over an optical link. This can be extended to a daisy-chain configuration in which three or more terminals are connected in series by a plurality of optical links. Ring configurations are also used, as well as other two-dimensional mesh networks. In each case, the optical link between two terminals typically includes a plurality of optical fibers for bidirectional communications, to provide redundancy in the event of a fault in one or more of the optical fibers, and for future capacity.

Despite the substantially higher fiber bandwidth utilization provided by WDM technology, a number of serious problems must be overcome, for example, multiplexing, demultiplexing, and routing optical signals, if these systems are to become commercially viable. The addition of the wavelength domain increases the complexity for network management because processing now involves both filtering and routing. Multiplexing involves the process of combining multiple channels (each defined by its own frequency spectrum) into a single WDM signal. Demultiplexing is the opposite process in which a single WDM signal is decomposed into individual channels or sets of channels. The individual channels are spatially separated and coupled to specific output ports. Routing differs from demultiplexing in that a router spatially separates the input optical channels to output ports and permutes these channels according to control signals to create a desired coupling between an input channel and an output port.

Note that each carrier has the potential to carry gigabits of information per second. Current technology allows for about forty channels or optical carriers, each of a slightly different wavelength, to travel on a single-mode fiber using a single WDM signal. The operating bands are limited by the EDFA amplifier (C) band, thus the increase in the number of channels has been accomplished by shrinking the spacing between the channels, and by adding new bands. The current standard is 50 and 100 GHz between optical channels, whereas older standards were 200 and 400 GHz spacings. Another characteristic of the WDM signal is the modulation rate. As the modulation rate is increased, more data can be carried. Current technology allows for a modulation rate of 10 Gigabits per second (Gbs). This has been recently increased from 2.5 Gbs. The 10 Gbs standard is SONET OC-192, wherein SONET is synchronized optical network and OC is optical carrier. The increase in the modulation rate translates into a wider signal in the spatial domain. Consequently, the wider signal and smaller spacing means that the signals are very close together (in the spatial domain), and thus are very hard to separate. As a result, crosstalk may occur from adjacent signals.

One prior art separation method is to divide the spatial band into four sub-bands, each about 200 GHz wide. The filters used to perform the separation have significant side slopes (i.e., they produce trapezoidal shapes), and thus overlap occurs between the bands. To prevent crosstalk, guard bands are placed at the boundaries of the sub-bands, where no signals are placed. These guard bands consume significant bandwidth, i.e., about 30%. Additional stages could be added to achieve 100 GHz bands, but this increases the bandwidth consumed by the guard bands.

Also dropping and adding channels is a problem. For example, in a group of 16 carrier channels, 4 might need to be dropped for distribution to a local metropolitan area and the other 12 carrier channels might need to be passed on to other remote destinations. This is typically accomplished by demodulating all 16 optical carriers to obtain 16 electronic signals, then remodulating the 12 carriers and processing the 4 electrical signals. Optical-to-electrical (O-E) converters are used at switching centers to demodulate all the optical signals, including those not intended for local distribution. The "long-haul" signals are processed to modulate a laser (E-O) converter for launch into optical fiber to their ultimate destinations. The channels vacated by taking off signals for local distribution can now be filled by new carriers to move signals from local switches to remote destination. These electrical-to-optical-to-electrical (OEO) "add/drop" operations are critical to network performance but require that all carriers on a fiber be demodulated, processed, and remodulated in order to pick off even a small fraction of the data flowing on the fiber. In the current art, there is no effective non-OEO method of simultaneously dropping a DWDM carrier with mixed traffic for local distribution while simultaneously passing the carrier through to a remote location.

SUMMARY OF THE INVENTION

This invention provides an optical wavelength add/drop multiplexer for communications between two optical links supporting wavelength division multiplexing (WDM). A wavelength slicer spatially separates the input signal into two sets of channels. An optical filter such as an interference filter, spatially separates the set of the input channels into an array of separated channels. A programmable optical add/drop switch array selectively routes channels from an array of input ports to an array of drop ports, substitutes channels from an array of add ports in place of the dropped channels, and routes the remaining input channels and added channels to an array of output ports. The channels from the output ports of the said add/drop switch array are then combined and transmitted into the second optical link. A network of wavelength slicers can be used to spatially separate the input signal into a larger number of sets of channels that can either be accessed by a number of add/drop switch arrays, or pass unchanged as "express lanes" to the second optical link. In an alternative embodiment, a circulated drop filter consisting of an optical circulator and a series of fiber Bragg gratings is used to select a predetermined series of input channels to be processed by the add/drop switch array, with the remaining channels being passed by the circulated drop filter as express lanes.

A primary object of the present invention is to provide an optical wavelength add/drop multiplexer that can separate multiple channels from an input WDM signal and selectively substitute channels from series of add ports in place of the input channels.

Another object of the present invention is to provide an optical wavelength add/drop multiplexer that can be used to augment the channel capacity of an existing central office equipment for optical communications.

These and other advantages, features, and objects of the present invention will be more readily understood in view of the following detailed description and the drawing.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 3:
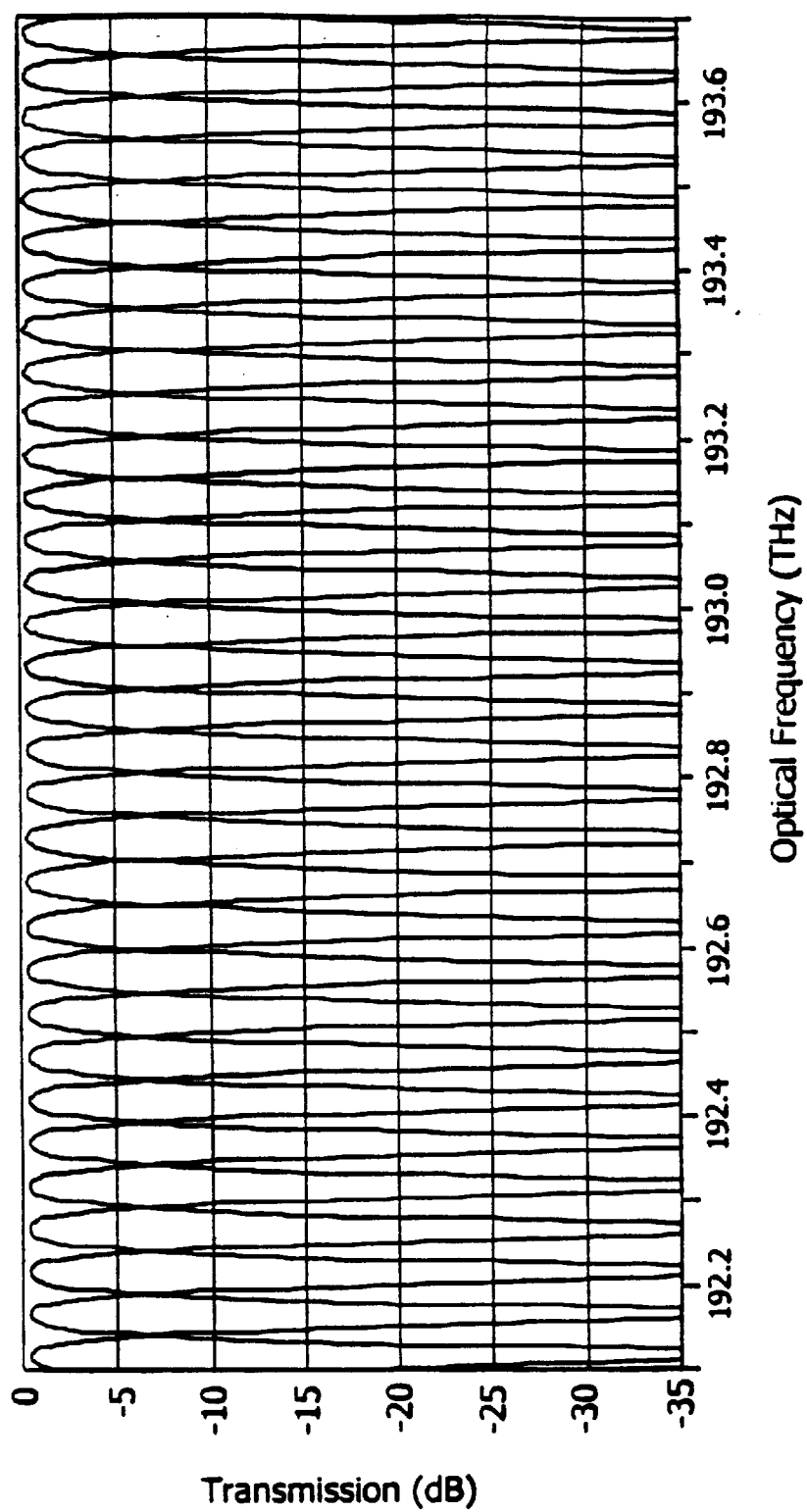
FIG. 3 is a spectral diagram of the transmission function of a wavelength slicer for separating adjacent 50 GHz input channels into two sets of output channels.

A WDM signal consists of multiple channels with each channel having its own range of wavelengths or frequencies. As used herein, the terms "channel" or "spectral band" refer to a particular range of frequencies or wavelengths that define a unique information signal. Each channel is usually evenly spaced from adjacent channels, although this is not necessary. For example, the wavelength slicers shown in FIG. 1 can separate channels based on a 50 GHz spacing between adjacent channels, as depicted in FIG. 3. Uneven spacing may result in some complexity in design, but, as will be seen, the present invention can be adapted to such a channel system. This flexibility is important in that the channel placement is driven largely by the technical capabilities of transmitters (i.e., laser diodes) and detectors and so flexibility is of significant importance.

The sets of input WDM channels are mutually exclusive, in that there is no overlap in the frequency bands assigned to channels in the different sets. In the preferred embodiment of the present invention, the first and second sets of channels are interdigitally spaced as shown in FIG. 1. For example, the spacing between adjacent channels in the first set can be 100 GHz, and the spacing between adjacent channels in the second set can be 100 GHz. The resulting interdigital spacing between channels after the first and second sets are combined would be 50 GHz. This type of arrangement allows for network planning. Consider the one 50 GHz signal to comprise two 100 GHz signals or four 200 GHz signals. Similarly, one 25 GHz signal comprises two 50 GHz signal or comprise four 100 GHz signals or eight 200 GHz signals or sixteen 400 GHz signals. These signals can be divided as needed to handle different situations. Note that other channel configurations could be employed, as long as there are at least two mutually exclusive sets of channels. For example, alternating blocks of channels could be used to define the first and second sets of channels.

Figure 1A:
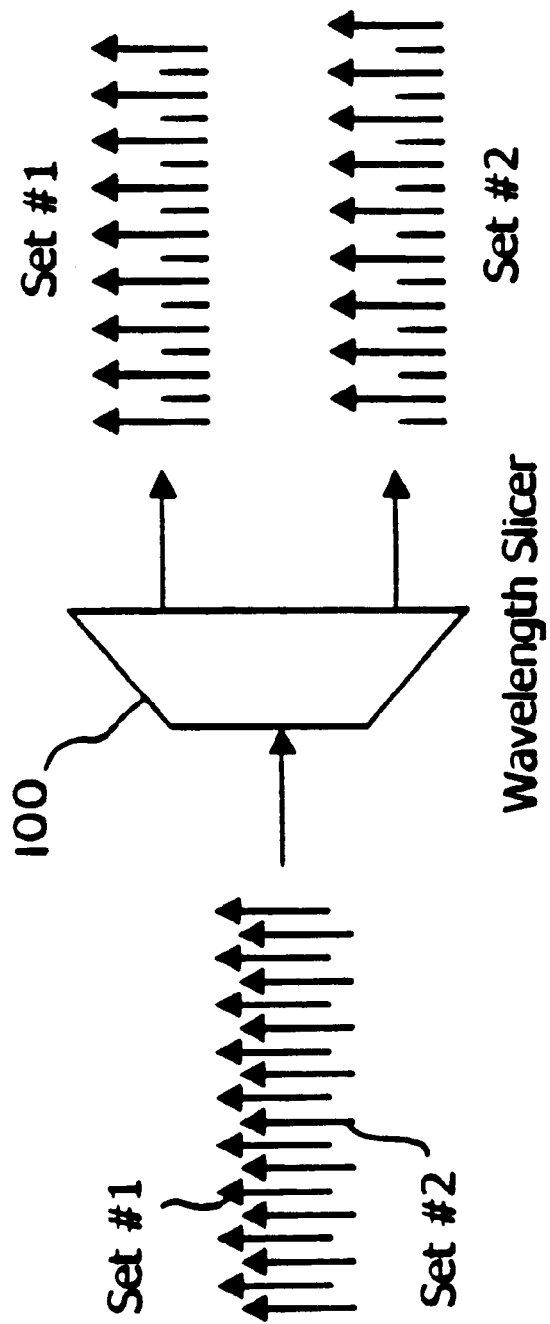
FIGS. 1A and 1B are simplified block diagrams illustrating the functionality of the wavelength slicers.
Figure 1B:
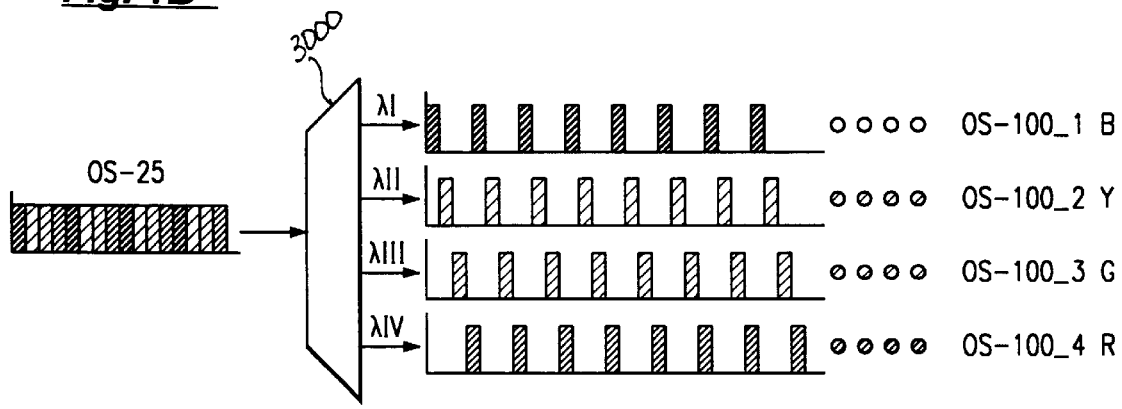

FIG. 1A is a block diagram illustrating the general functionality of an individual wavelength slicer 100 as a component in a larger network system. The input WDM signal is coupled using conventional optical signal coupling techniques to the input port of the wavelength slicer 100. The wavelength slicer 100 separates the input signal into two sets of channels, which are routed to the output ports as depicted in FIG. 1A. FIG. 1B depicts a 1×4 slicer 3000. The input signal is a 25 GHz spaced signal, OS-25, which is divided into four 100 GHz signals by slicer 3000. Note that each of these signals are orthogonal to each other, i.e. they do not overlap. Also note that they are synchronized in the wavelength domain. This 1×4 slicer can be constructed by cascading two 1×2 slicers of FIG. 1A.

In the preferred embodiment, the wavelength slicer 100 separates alternating adjacent input channels into the first and second sets of output channels. FIG. 3 illustrates the transmission characteristics of a wavelength slicer with a channel spacing of 50 GHz. Each wavelength slicer 100 is inherently bidirectional, and therefore can be used interchangeably either to separate (or demultiplex) an input signal into two sets of output channels, or to combine (or multiplex) two sets of input channels into a combined output WDM signal. Note that no guard bands are needed. Moreover, the system is scalable, e.g. when a 25 GHz spacing is available, a 25 GHz slicer is attached in front of the 50 GHz slicer and a second 50 GHz slicer network may be added to the 25 GHz network. Further note, that by separating the adjacent channels, good isolation between adjacent channels is achieved.

Figure 2:
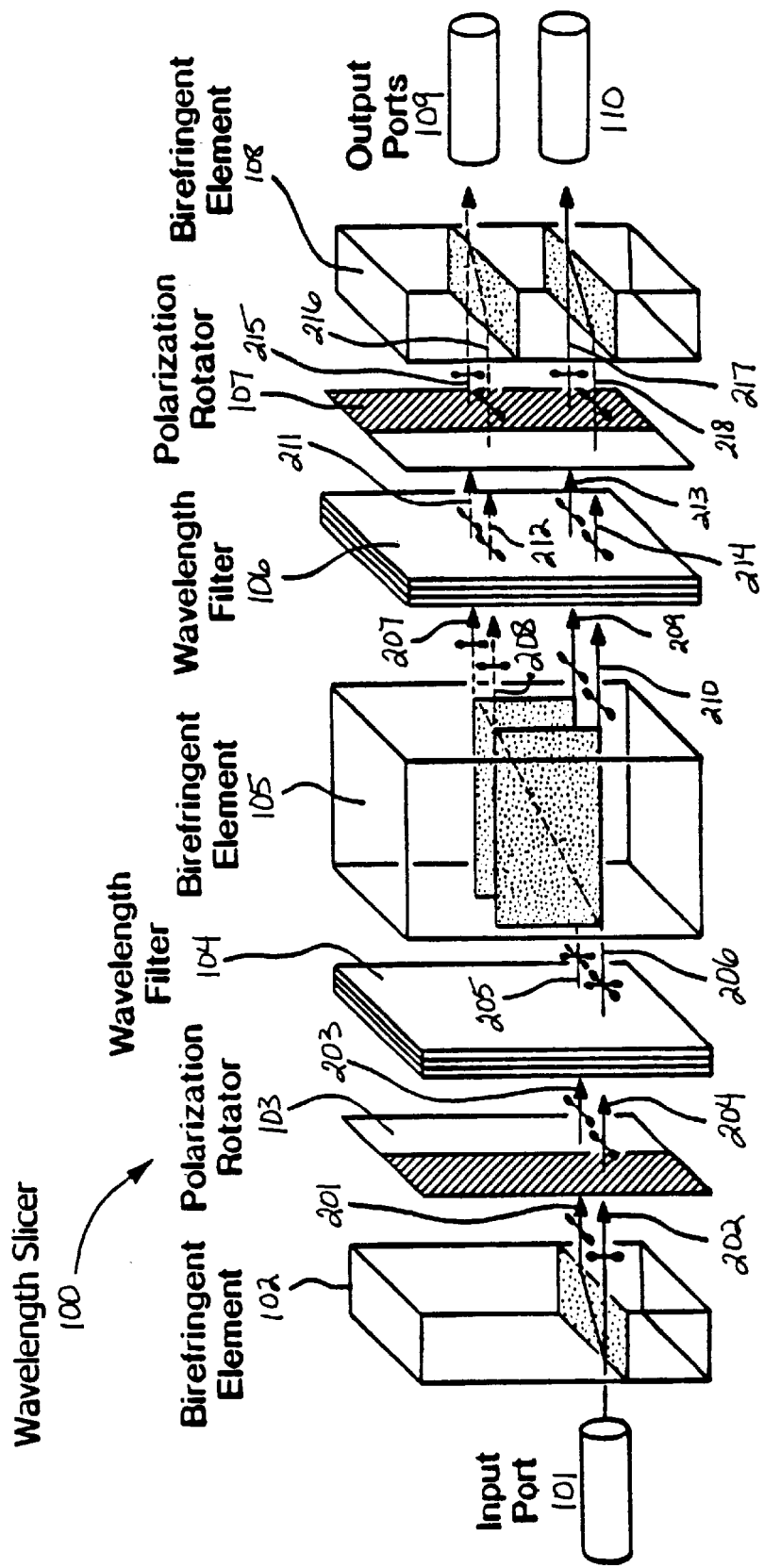
FIG. 2 is a schematic block diagram of a wavelength slicer.

FIG. 2 depicts the details of the structure and operation of one possible implementation of a wavelength slicer, for other implementations see "SWITCHABLE WAVELENGTH ROUTER," U.S. application Ser. No. 08/780,291, filed Jan. 8, 1997, which is hereby incorporated herein by reference.

FIG. 2 is a detailed schematic diagram of a wavelength slicer 100. Each of the optical paths is labeled with either a horizontal double-headed line indicating horizontal polarization (p polarization), or a vertical double-headed line indicating vertical polarization (s polarization, which may be depicted as "·"), or both horizontal and vertical double-headed lines indicating mixed horizontal and vertical polarizations in the optical signal at that point.

The input signal 101 enters the first birefringent element 102 that spatially separates horizontal and vertically polarized components of the input signal. The first birefringent element 102 comprises a material that allows the vertically polarized portion of the optical signal to pass through without changing course because they are ordinary waves in the birefringent element 102. In contrast, horizontally-polarized waves are redirected at an angle because of the birefringent walk-off effect. The angle of redirection is a well-known function of the particular materials chosen. Examples of materials suitable for construction of the birefringent element include calcite, rutile, lithium niobate, YVO$_4$-based crystals, and the like. The horizontally-polarized component travels along a path 201 as an extraordinary signal in the first birefringent element 102 while the vertically polarized component 202 travels as an ordinary signal and passes through without spatial reorientation. The resulting signals 201 and 202 both carry the full frequency spectrum of the input signal 101.

At least one of the beam components 201 and 202 are coupled to a polarization rotator 103 which selectively rotates the polarization state of either beam component 201 or 202 by a predefined amount. In the preferred embodiment, the rotator 103 rotates the signals by either 0° (i.e., no rotation) or 90°. In FIG. 2, the vertically-polarized component 202 is rotated by 90° so that both signals 203, 204 exiting the polarization rotator 103 have a horizontal polarization. Again, at this stage, both the horizontal and vertical components 202, 203 contain the entire frequency spectrum of channels in the input WDM signal 101.

The stacked waveplates element 104 is a stacked plurality of birefringent waveplates at selected orientations that generate two eigen states. The first eigen state carries a first set of channels with the same polarization as the input, and the second eigen state carries a complementary set of channels at the orthogonal polarization. The polarization of the incoming beam and the two output polarizations form a pair of spectral responses, where (H, H) and (V, V) carry the first set of channels from the input spectrum and (H, V) and (V, H) carry the complementary (second) set of channels of the input spectrum, where V and H are vertical and horizontal polarization, respectively. With horizontal polarizations 203, 204 input to the first stacked waveplates element 104 as illustrated in FIG. 2, orthogonal vertical and horizontal polarizations are generated with the first set of channels residing in horizontal polarization and the second set of channels residing in vertical polarization.

The pairs of optical responses 205, 206 output by the first stacked waveplates element 104 are coupled to a second birefringent element 105. This birefringent element 105 has a similar construction to the first birefringent element 102 and spatially separates the horizontally and vertically polarized components of the input optical signals 205 and 206. The optical signals 205, 206 are broken into vertically-polarized components 207, 208 containing the second set of channels and horizontally-polarized components 209, 210 containing the first set of channels. Due to the birefringent walk-off effect, the two orthogonal polarizations that carry first set of channels 209, 210 in horizontal polarization and second set of channels 207, 208 in vertical polarization are separated by the second birefringent element 105.

Following the second birefringent element 105, the optical elements on the input side of the second birefringent element 105 can be repeated in opposite order, as illustrated in FIG. 2. The second stacked waveplates element 106 has substantially the same composition as the first stacked waveplates element 104. The horizontally-polarized beams 209, 210 input to the second stacked waveplates element 106, are further purified and maintain their polarization when they exit the second stacked waveplates element 106. On the other hand, the vertically-polarized beams 207, 208 experience a 90° polarization rotation and are also purified when they exit the second stacked waveplates element 106. The 90° polarization rotation is due to the fact that the vertically-polarized beams 207, 208 carry the second set of channels and are in the complementary state of stacked waveplates element 106. At the output of the stacked waveplates element 106, all four beams 211, 212 and 213, 214 have horizontal polarization. However, the spectral bands defined by the filter characteristics of the stacked waveplates elements 104, 106 are separated with the second set of channels on top and the first set of channels below.

To recombine the spectra of the two sets of beams 211, 212 and 213, 214, a second polarization rotator 107 and a third birefringent element 108 are used. The second rotator 107 intercepts at least two of the four parallel beams 211–214 and rotates the polarization of the beams to produce an orthogonally-polarized pair of beams 215, 216 and 217, 218 for each spectral band at the output of the second polarization rotator 107. In the case of FIG. 2, the polarization of beams 211 and 213 is rotated by 90°, and beams 212 and 214 are passed without change of polarization. Finally, a third birefringent element 108 recombines the two orthogonally-polarized beam pairs 215, 216 and 217, 218 using the walk-off effect to produce two sets of channels that exit at the output ports 109 and 110, respectively.

The slicer shown in FIG. 2 can be used to slice a WDM signal into bands, each of which comprises a plurality of wavelength channels, additional slicers would be used to separate the bands down to individual channels. This is depicted in FIG. 4.

Figure 4:
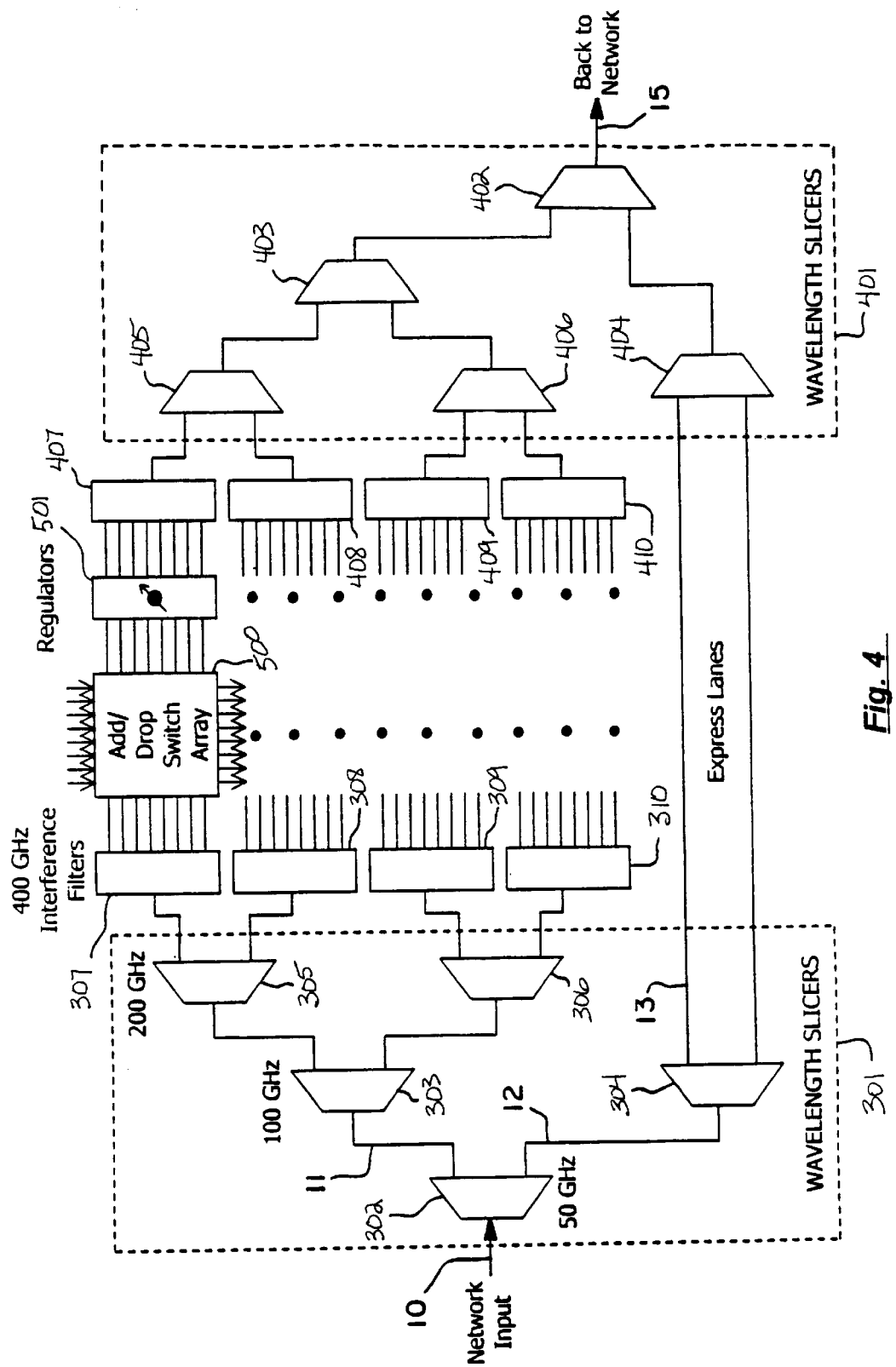
FIG. 4 is a spectral diagram of the transmission function of a wavelength slicer for separating adjacent 50 GHz input channels into two sets of output channels.

FIG. 4 provides an overall schematic diagram 400 of an embodiment of the present invention using two networks 301 and 401 of wavelength slicers. Input WDM signals 10 from an optical link are coupled to the input port of a first wavelength slicer 302. The input WDM signal comprises multiple channels with each channel having its own range of wavelengths or frequencies.

Each wavelength slicer 302–306 in the wavelength slicer network 301 spatially separates a set of input WDM channels into two complementary sets of output channels. In the preferred embodiment, each wavelength slicer separates alternating adjacent input channels into first and second sets of output channels as shown in FIG. 1. The first wavelength slicer 302 separates the network input signal 10 into a first set of channels 11 that are routed to wavelength slicer 303, and a second set of channels 12 that are routed to wavelength slicer 304. For example, the initial wavelength slicer 302 can separate channels based on a 50 GHz spacing between adjacent channels.

The first set of channels output by the initial wavelength slicer 302 is routed along a first optical path 11 to second and third stage wavelength slicers 303, 305, and 306. The second set of channels output by the initial wavelength slicer 303 is routed along a second optical path 12 to wavelength slicer 304. The second state of wavelength slicers 303, 304 further separate the input channels into four sets of channels. For example, the second state of wavelength slicers 303, 304 separates channels based on a 100 GHz spacing between adjacent channels. This process can be continued by cascading additional stages of wavelength slicers to achieve up to 2N sets of channels, where N is the number of stages. For example, the wavelength slicer network 301 has a partial third state consisting of wavelength slicers 305 and 306.

The output channels from wavelength slicer 304 exit the first wavelength slicer network 301 along optical path 13 without further processing. These output channels are referred to as "express lanes" and pass directly to the second wavelength slicer network 401 used to recombine the optical signals that are to be returned to the optical network, as will be discussed below. Optionally, wavelength slicers 304 and 404 could be eliminated so that the second set of optical signals from the initial wavelength slicer 302 would serve as the express lanes and pass directly to the final wavelength slicer 402 in the second wavelength slicer network 401.

The first set of channels are further subdivided into four sets of channels that are received as inputs by an array of optical filters 307, 308, 309, and 310. These optical filters 307–310 separate the input sets of channels into an array of separated channels. The implementation shown in FIG. 4 is based on commercially-available interference filter arrays that can separate up to eight channels. However, other types of optical filters can be employed for spatially separating the channels. The type of optical filter used and the number of filters in the array are purely matters of convenience of design. As an alternative, additional slicers could be used.

The array of separated channels are connected to the input ports of a series of programmable optical add/drop switch arrays 500. Here again, any number of add/drop switch arrays can be employed to handle any desired number of channels based on design requirement.

Each add/drop switch array 500 also has a corresponding arrays of output ports, add ports, and drop ports. The add/drop switch array 500 selectively routes channels from the input ports to its drop ports; substitutes channels from the add ports in place of the dropped channels; and routes the remaining input channels and the added channels to the output ports of the add/drop switch array 500.

The array of output channels from the add/drop switch array 500 passes through a regulator 501, which adjustably regulates the optical power level of each channel. The output channels are then combined so that they can be transmitted through a second optical link 15 in the optical network. The means for combining the output channels consists of a second array of interference filters 407–410 and a second wavelength slicer network 401. These devices are inherently bi-directional, and therefore can be used to multiplex as well as demultiplex the WDM signal for the optical network. Each of the interference filters 407–410 in the second array combines eight channels as an inverse operation of that performed by the first array of interference filters 307–310. The second array of interference filters 407–410 also serves to purify the spectral characteristics of the output channels and reduce cross-talk. Wavelength slicers 405, 406, and 403 in the second wavelength slicer network 401 multiplex the sets of channels from the second array of interference filters 407–410 as an inverse operation to the demultiplexing provided by wavelength slicers 303, 305, and 306 in the first wavelength slicer network 301. Similarly, wavelength slicers 404 and 402 combine the express lanes 13 with the multiplexed channels from the wavelength slicer 403 to reconstitute the entire WDM signal for the optical network.

It should be understood that other means could be readily substituted to combine output channels from the add/drop switch arrays 500 and the express lanes 13 since each channel has a unique wavelength.

Figure 5:
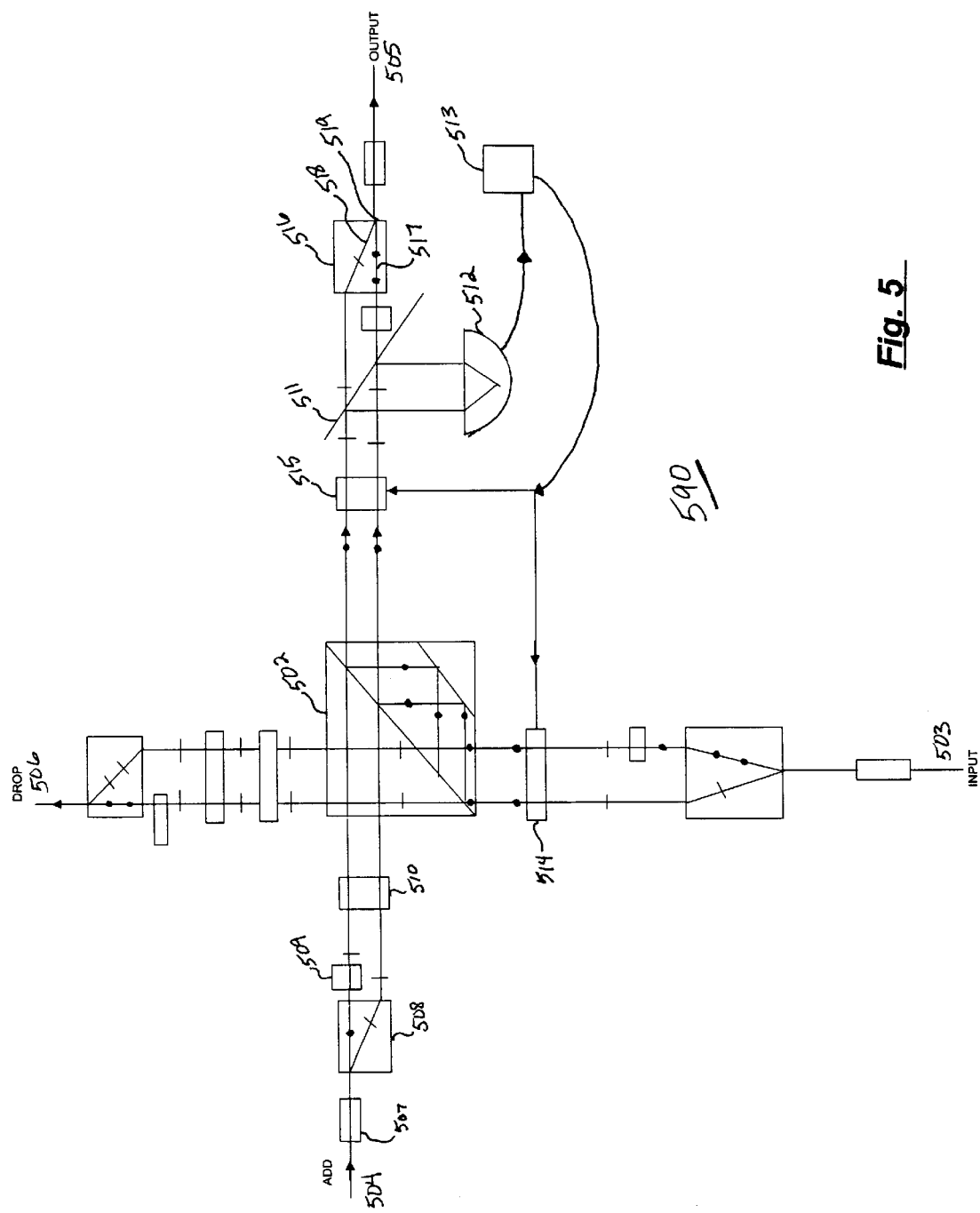
FIG. 5 depicts a smart switch utilizing a high extinction ratio polarization beamsplitter.

FIG. 5 depicts an add/drop smart switch 590 for use in the switch array 500. The array would be comprised of 32 switches 590, each of which can be individually controlled to selectively replace one of the input channels with one of the add channels. The smart switch 590 is described more fully in Applicant's U.S. patent application Ser. No. 09/326,251, entitled "FIBER OPTIC SMART SWITCH," which is hereby incorporated herein by reference.

The smart switch 590 includes a polarization beam splitter 502 which is shown in Applicant's U.S. Pat. No. 6,160,665, entitled "HIGH EXTINCTION RATIO POLARIZATION BEAMSPLITTER," which is hereby incorporated herein by reference. The beamsplitter 502 operates to pass p light (horizontal or "|") through the beamsplitting surfaces, and deflects s light (vertical or "·"). Thus, when the input 503 and the add 504 signals are in p light, the input 503 signal is routed to the drop port 506 and the add 504 signal is routed to the output port 505. This mode is known as the add/drop mode. When the input 503 is s light, the input 503 signal is routed to the output port 505. This mode is known as the bypass or pass through mode. Note that in this mode there is no add signal. To properly process the signals, the switch 590 includes a collimator 507 to collimate the input/add light, and birefringent separator elements 508 to separate the light into its p and s components and to laterally displace the p and s components.

The birefringent element 508 is made of a material that allows the vertically polarized portion of the optical signal to pass through without changing course because they are ordinary waves in the birefringent element 508. In contrast, horizontally polarized waves are redirected at an angle because of the birefringent walk-off effect. The angle of redirection is a well-known function of the particular materials chosen. Examples of materials suitable for construction of the birefringent elements used in the preferred embodiments include calcite, rutile, lithium niobate, YVO4 based crystals, and the like.

The switch also uses a halfwave plate 509 to change one of the polarization components into the other component, (as shown, the plate changes the s component into p light, however it could be placed in front of the p component) and thus all of the light incident onto the rotator is of the same polarization type. Each output/drop port includes a reverse of the input elements. Note that the halfwave plate on the output port is on the opposite branch from plate 509. This provides balance to the system by having the light from each branch pass through the same number of optical elements. Also, note that since the smart switch 590 performs regulation, the additional regulator 501 is not needed.

The PBS 502 is surrounded by four polarization controllers or rotators 510. The rotators 510 are used to control the polarization of the light received by the PBS. The voltage applied to the rotators causes the light to either pass through unrotated (15 volts) or rotated such that p becomes s and s becomes p (0 volts). For example, if the light incident onto the PBS is made to be p light, the light will pass through the PBS, and if the light is made to be s light, the light will be deflected by the PBS. The switchable polarization rotators 510, 514, 515 can be made of one or more types of known elements including parallel aligned liquid crystal rotators, twisted pneumatic liquid crystal rotators, ferro electric liquid crystal rotators, pi-cell liquid crystal rotators, magneto-optic based Faraday rotators, acousto-optic and electro-optic polarization rotators. Commercially available rotators using liquid crystal based technology are preferred.

The switch 590 includes a partially reflecting mirror 511 which passes about 95% of the incident light, and deflects about 5% of the light. The deflected 5% is indecent onto a detector 512 which measures the amount of light. The controller electronics 513 uses this measurement to control the rotators, as shown input rotator 514 and output rotator 515. Note that the voltage being applied to the rotators can be varied between 0–15 volts, the voltage level determines how much of the light is rotated.

By controlling the voltage level to the input rotator 514, the add/drop switch can have a drop and continue operation. For example, if the rotator 514 changes both branches of the input signal to half p and half s, then half of the input signal will be routed to the drop port 506, and half of the input signal will be routed to the output port 505. This operation allows for the input signal to be split, and thus shared between two network components. The operation also allows for the regulation/attenuation of the output signal 505 by shunting a portion of the input signal to the drop port. This prevents the output signal 505 from this switch to be greater than output signals from other switches in the array 500. The add signal can be similarly controlled. Note that by controlling the output rotator 515, the output signal can also be controlled in such a manner.

As shown in FIG. 5, the input signal is split into two components during processing, and recombined by a birefringent element 516 prior to outputting. The output rotator 515 can introduce both p and s polarizations into each branch of the signal. Normally, the vertical branch 517 passes through the element, and thus the output collection point 519 is located along this path. The horizontal branch 518 is deflected into the path of the vertical branch 517 for collection. However, if the vertical branch 517 has been changed to include a horizontal component, then this component is deflected out of the element and away from the collection point 519. Similarly, if the horizontal branch 518 has been changed to include a vertical component, then this component will pass through the element and away from the collection point 519. Thus, this rotator 505 will provide for regulation/attenuation of the output signal. The drop signal can be similarly controlled.

Figure 6:
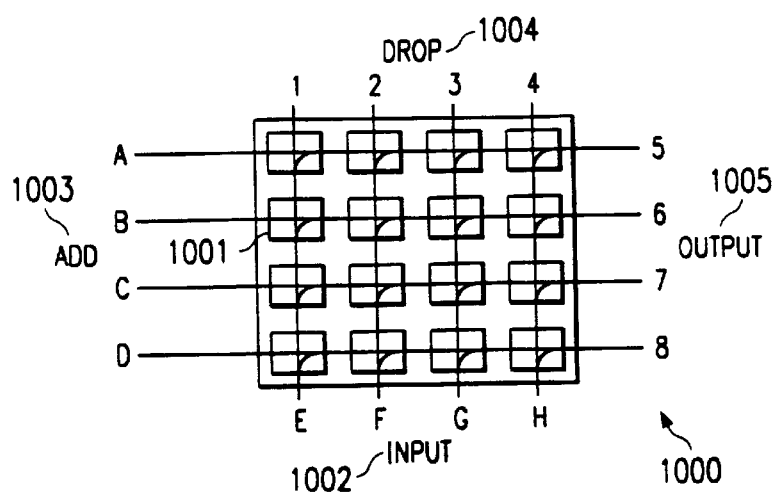
FIG. 6 depicts a 4×4 add/drop switch array.

The array of add/drop switches can be formed in matrix arrangement to allow for interconnection or cross-connection of the add and drop ports. FIG. 6 depicts a 4×4 array 1000 of PBSs 700. In front of each input path to each respective PBS is a polarization controller (not shown) which controls the polarization of the light entering the respective PBS, i.e., the controller could change the light such that the light incident onto the PBS is p light or s light. In the add/drop mode, where the input goes to drop, and the add goes to output, each of the add signals, ABCD, would go to a respective output path, 5678. Similarly, each input signal, EFGH, would go to a respective drop path, 1234. The add/drop mode is accomplished by setting the various rotators to emit only p light.

In the bypass mode, each input signal, EFGH, could be directed to any one of the output paths 5678. Thus, inputs EFGH could be outputted to 5678, 5867, etc. The bypass mode is accomplished by setting particular ones of the rotators to s light. For example, to have the E input switched to output 6, the input rotator for unit 1001 would be set to provide s light to the unit. The other units in the E input column would be set to provide p light such that the light would pass through the PBSs, until encountering unit 1001. The output rotator from 1001 would be set to provide p light such that the light passes through the units of the output 6 row, and consequently be delivered to output 6. Thus, the various rotators are used to control the polarization of the light that is incident onto the various PBSs of the switch module, and thus control their connection.

Note that the various combinations of the switch and pass through states can be achieved. For example, input E could be routed to drop, inputs FGH could be routed to outputs 567, respectively, and add D could be routed to output 8. As general rules, input E can be routed to any of 15678, input F can be routed to any of 25678, input G can be routed to any of 35678, input H can be routed to any of 45678, while input A can be routed to 5, input B can be routed to 6, input C can be routed to 7, and input D can be routed to 8. Note that the 4×4 arrangement is by way of example only, as the PBS can be arranged in a N×M array, see "N×M DIGITALLY PROGRAMMABLE OPTICAL ROUTING SWITCH USING HIGH EXTINCTION RATIO POLARIZATION BEAM SPLITTER," Applicant's U.S. patent application Ser. No. 09/326,250, which is incorporated herein by reference. The switch described above is actually more than 4×4, as defined by the conventional definition. It has a total of 16 ports, 4 input and 4 output ports are cross connected. The other set of 4/4 input/output ports are used for add/drop operation. This feature is not available in the prior art. Note that each of the switches in the array may be a smart switch, and thus have its respective rotators controlled by varying the applied voltage based on the output (or drop) light.

Figure 7:
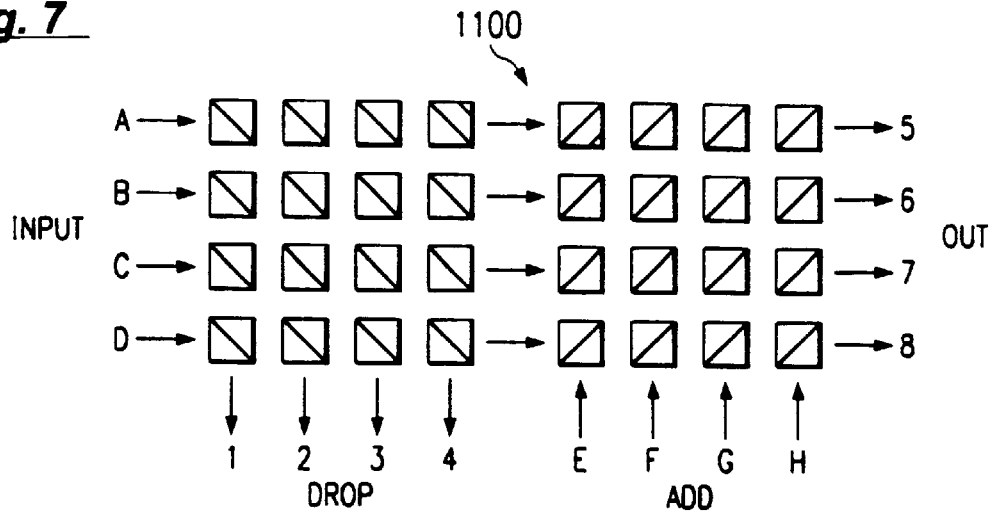
FIG. 7 depicts two 4×4 add/drop switch arrays forming an arbitrary add/drop switch.
Figure 13:
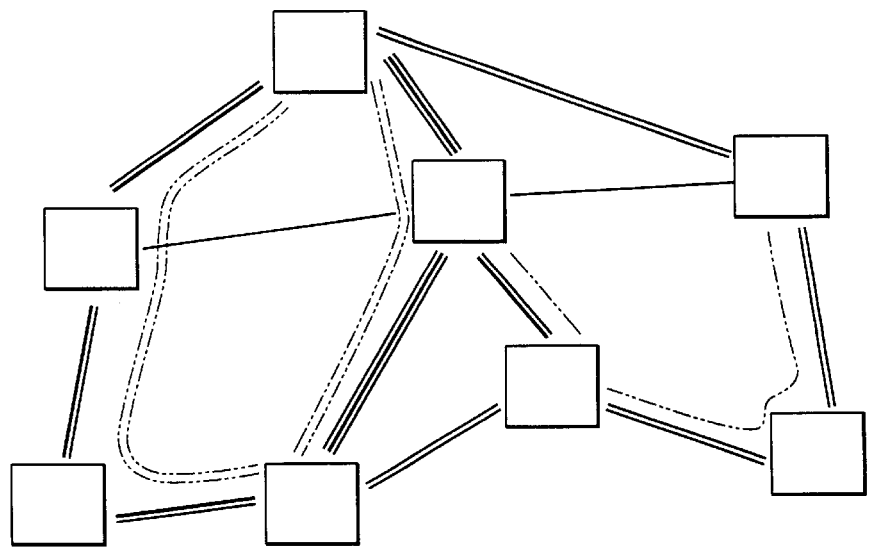
FIG. 13 depicts a mesh network system.

FIG. 7 depicts an arbitrary add/drop switch 1100. This switch is comprised of two 4×4 modules of FIG. 6, note that only one set of input/output elements are needed. This arrangement permits any input signal ABCD to be dropped to any drop path 1234. Similarly any add signal EFGH can be delivered to any output path 5678. Also the input signals ABCD can be passed through to their respective output paths 5678. Again, each of the switches in the array may be a smart switch, and thus have its respective rotators controlled by varying the applied voltage based on the output (or drop) light. This arrangement allows for a mesh type connection, as shown in FIG. 13, and thus is useable with internet protocol (IP). Consequently, IP protocol data can be routed over WDM. Also, as demonstrated by FIG. 4, different amounts of bandwidth can be allocated to different areas. For example, if the local area needs more bandwidth, then the express lanes could be routed into the local area. If less bandwidth is needed, then more express lanes could be created. This is shown in FIG. 13 by the different thickness of lines, including higher bandwidths (or smaller signal spacing, e.g. 50 GHz) and numbers of lines (numbers of fibers).

Figure 8:
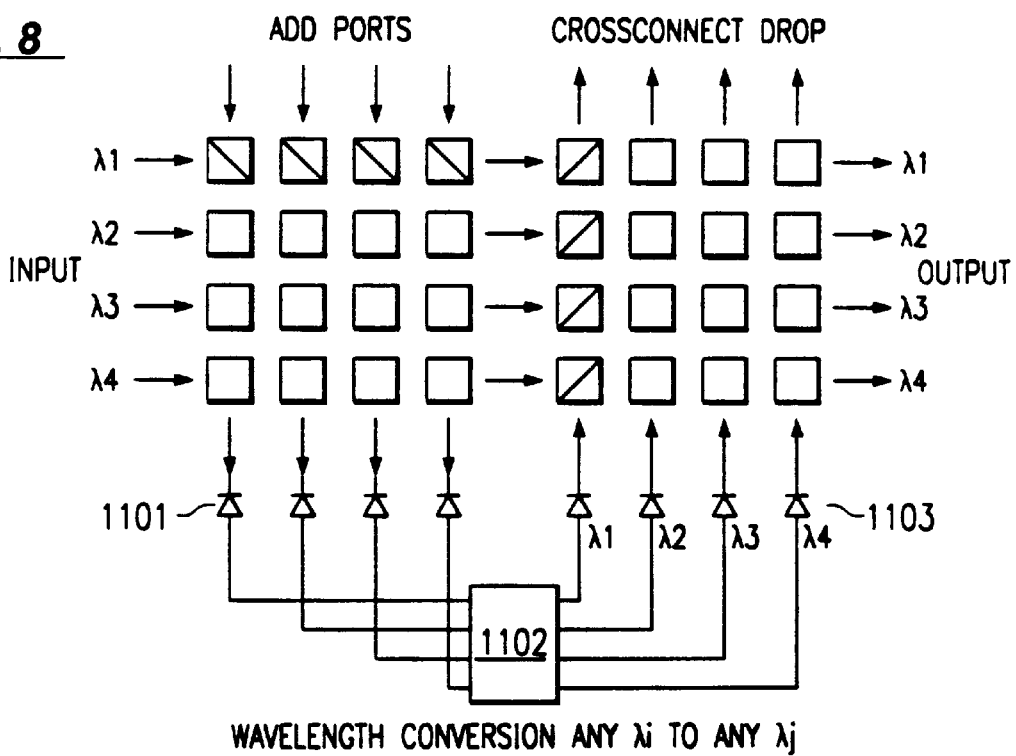
FIG. 8 depicts a 4×4 add/drop switch with wavelength conversion.

FIG. 8 depicts the arbitrary add/drop switch of FIG. 7 with wavelength conversion. In addition to operations described in FIG. 7, each input signal λ1, λ2, λ3, λ4, can be routed to any of the detectors 1101, where each signal is converted into an electrical signal and processed by electronics 1102. The output electrical signal are then sent to respective lasers 1103 for retransmission as light. Each light output from the lasers can be routed to any of the output paths. Again, each of the switches in the array may be a smart switch, and thus have its respective rotators controlled by varying the applied voltage based on the output (or drop) light.

Each of the types of add/drop switches would provide the network of FIG. 4 with different operating capabilities. Note that other add/drop switches as described in Ser. No. 09/326,256 entitled "OPTICAL ADD/DROP WAVELENGTH SWITCH USING A HIGH EXTINCTION RATIO POLARIZATION BEAMSPLITTER," which is incorporated herein by reference, could be used herein as array 500.

Also note that the network of FIG. 4 could be protected according to the fault handling mechanisms described in Applicant's U.S. Pat. No. 5,115,155, entitled "SYSTEM FOR DEALING WITH FAULTS IN AN OPTICAL LINK," filed Nov. 12, 1998, which is incorporated herein by reference. This type of OS protection is useful for handling IP protocol data. Layer 3 protection is provided by the internet protocol.

Figure 9:
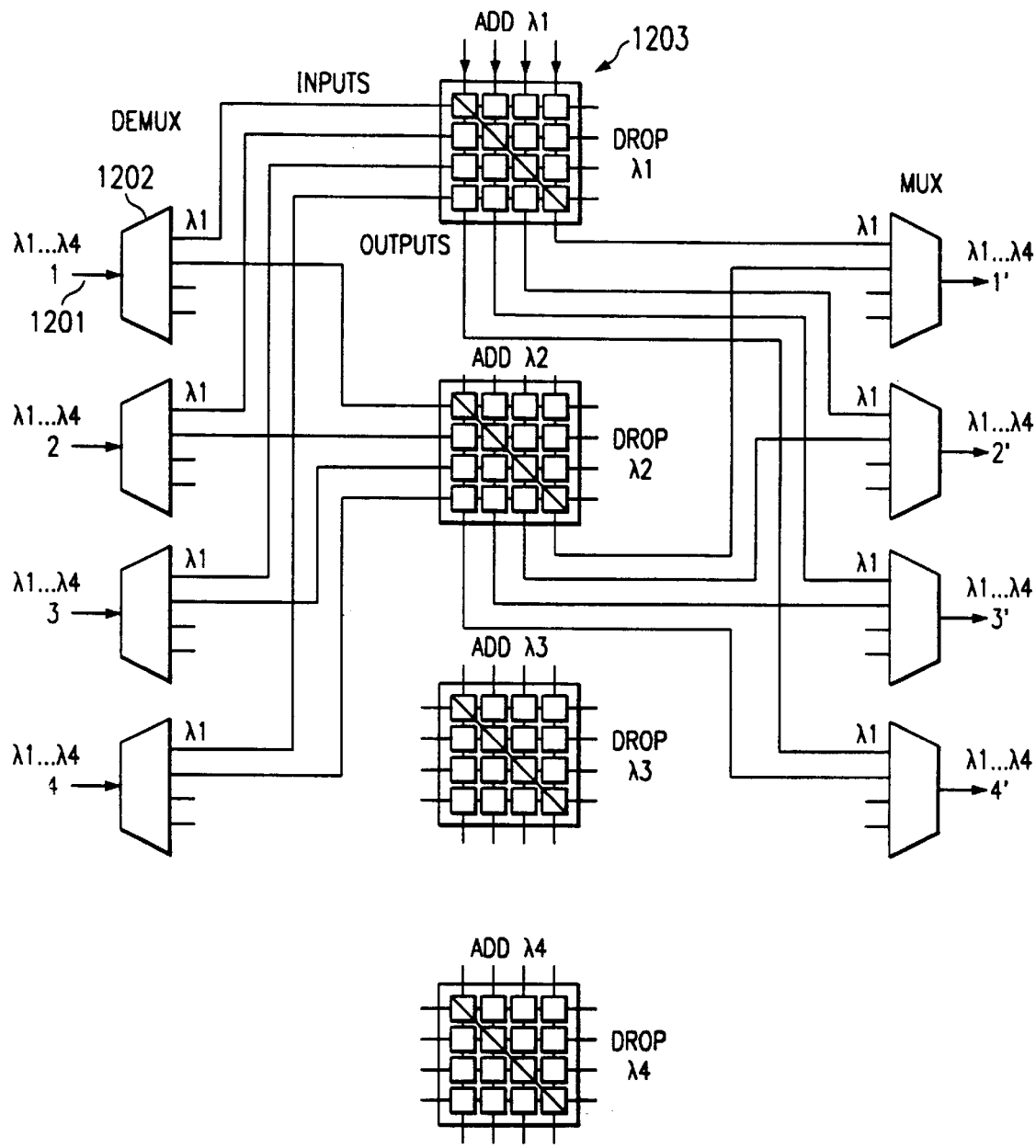
FIG. 9 depicts a drop/add switch for wavelength management and restoration.

FIG. 9 depicts a drop/add switch for wavelength management and restoration. Note that FIG. 9 includes four fibers 1201, and four 4×4 modules 1203. Note that the number of fibers is by way of example only, as more fibers would merely require a scaled drop/add switch. Also note that the modules are shown as being only partially connected to the DEMUXes and MUXes to simplify the figure. Further note that λ1, λ2, λ3, and λ4, can be viewed as λb (blue), λg (green), λy (yellow), and λr (red). Each fiber carries different signals which are encoded by wavelength, e.g., λ1, λ2, λ3, λ4. These signals are demultiplexed by DEMUX 1202. Each wavelength from each fiber is provided to a particular 4×4 module, e.g. λ1 from each of the four fibers is provided to module 1203. Within each module 1203, the operations are as described with respect to FIG. 6. Thus, particular signals can be dropped or added or re-routed to the output. Note that the diagonal slash through each module indicates the orientation of the PBSs within the module. For a further discussion on multiple wavelength management, see related application "MULTI-WAVELENGTH CROSS CONNECT OPTICAL NETWORK," Applicant's U.S. Pat. No. 6,005,697, which is incorporated herein by reference.

Figure 10:
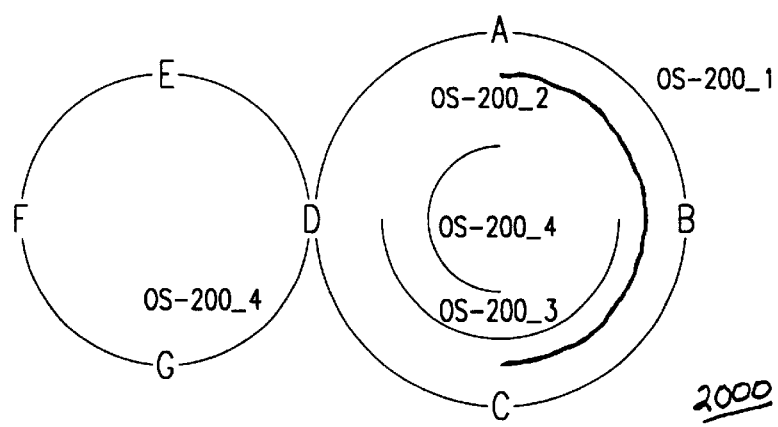
FIG. 10 depicts a multi-ring network system.
Figure 11:
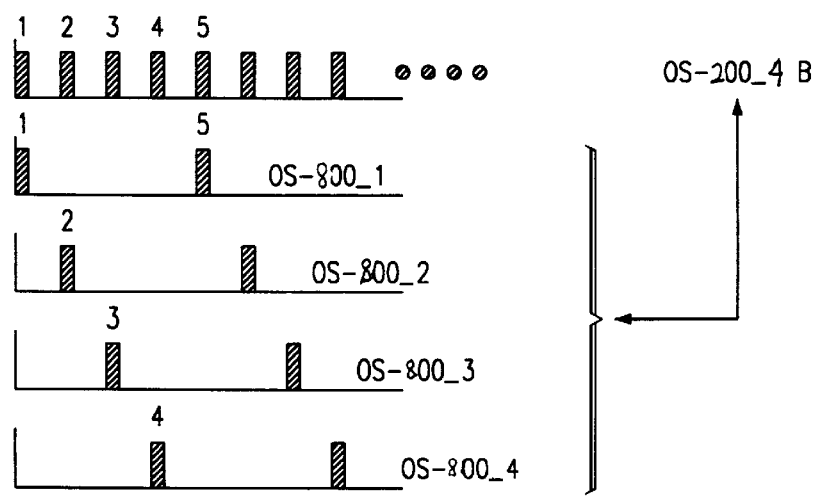
FIG. 11 depicts the a OS-200 signal being sub-divided into four OS-800 signals.

FIG. 10 depicts a multi-ring network system 2000 connecting seven nodes A, B, C, D, E, F, and G. Note that the ring connecting DEFG is connected by an OS-200-4 line, while another OS-200-4 line ring connects ADC, without connecting B. The ABC ring is connected by an OS-200-2 line. The OS-200-1 ring connects ABCD, and OS-200-3 ring connects nodes BCD. The various switches described above allow this network to have express connections, to perform local add/drops of signals. For example, node E could comprise the switch shown in FIG. 6, where the OS-200 is sliced down to four OS-800 signals and can perform add/drops to those signals. Node D could comprise the wavelength cross-connect switch shown in FIG. 11, each OS-200-4 signals can be divided into four OS-800 signals. Note that FIG. 9 would be simplified in this case, as it would have four 4×4 switches with two input DEMUXs. The two OS-200-4 fibers would be inputted into the input DEMUXs, and processed into the switches from there. An OS-800 signal from one of the fibers can be connected into the other input line, or other signals can be added into the lines, etc.

Figure 12:
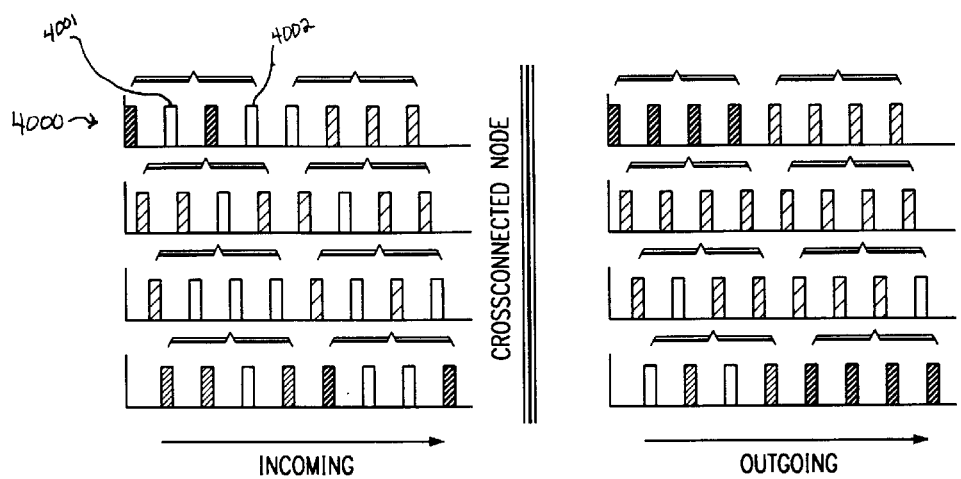
FIG. 12 depicts wavelength slot interchange.

As shown in FIG. 12 a cross-connected node, such as node D in FIG. 10, can facilitate empty slots being filled via wavelength slot interchange. For example, train 4000 has empty slots 4001, 4002. These may be filled via an add/drop switch with wavelength conversion as shown in FIG. 8. In other words, a signal can have its wavelength changed, and be added into an empty slot. Also the wavelength cross-connect switch shown in FIG. 9 can be used to move a signal with the same wavelength from a different train in the empty slot.

The above disclosure sets forth a number of embodiments of the present invention. Other arrangements or embodiments, not precisely set forth, could be practiced under the teachings of the present invention and as set forth in the following claims.

Other types of frequency multiplexers and demultiplexers could be readily substituted in place of the wavelength slicers 101–104 shown in FIGS. 1–3. For example, a set of polarization rotators and a polarized beamsplitter can be used to combine the first and second sets of channels, in place of wavelength slicers 101 and 102 in terminal 1. Demultiplexing can be accomplished by filters or diffraction gratings, although such approaches would tend to be less efficient and more expensive.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. In an optical communication system comprising a plurality of optical paths, a node coupled to at least one of the optical paths, the node comprising:

a demultiplexer operable to receive an input wavelength division multiplexed (WDM) signal and to separate the input WDM signal into at least a first subset of wavelength signals comprising a first plurality of wavelengths and a second subset of wavelength signals comprising a second plurality of wavelengths different from and interdigitally spaced among the first plurality of wavelengths, wherein the first and second pluralities of wavelength signals are processed differently depending on the wavelengths in each plurality of wavelength signals;

an express path operable to receive from the demultiplexer the first subset of wavelength signals, and to pass those wavelength signals from the node without further processing; and a processing path operable to receive from the demultiplexer the second subset of wavelength signals such that those wavelength signals are processed within the node, wherein the processing path comprises an optical router operable to route at least some of the second subset of wavelength signals for receipt by another node in the communication system without converting the at least some of the second subset of wavelength signals to an electrical format.

2. The node of claim 1, wherein the processing path comprises an optical add/drop multiplexer comprising:
a plurality of input ports each operable to receive a wavelength signal from the second subset; and
a plurality of add ports each operable to receive one of a plurality of add signals;
wherein for each input port, the optical add/drop multiplexer is operable to selectively route either a wavelength signal or an add signal to a corresponding output port.

3. The node of claim 1, wherein the input WDM signal comprises a first input WDM signal and wherein the processing path comprises:
an optical cross connect operable to receive the second subset of wavelength signals of the first input WDM signal and to receive a third subset of wavelength signals of a second input WDM signal, the optical cross connect operable to selectively substitute a wavelength signal from the third subset for a wavelength signal of the second subset of wavelength signals.

4. The node of claim 3, wherein the wavelength signal from the third subset and the wavelength signal from the second subset comprise approximately the same wavelength.

5. The node of claim 3, wherein the first input WDM signal was receive by the node from a first optical path coupled to the node, and wherein the second input WDM signal was received by the node from a second optical path coupled to the node, wherein the optical cross connect is operable to interchange wavelength signals between the first and second paths coupled to the node.

6. The node of claim 1, wherein the processing path comprises a Synchronous Optical Network (SONET) router operable to electronically process and facilitate routing to other nodes in the communication system information carried by at least some of the second subset of wavelength signals.

7. The node of claim 1, further comprising a multiplexer operable to receive the second subset of wavelength signals from the processing path and to combine the second subset of wavelength signals with at least one other subset of wavelength signals to form an output WDM signal.

8. The node of claim 1, wherein the processing path comprises a protection path operable to facilitate routing at least some of the second subset of wavelength signals to another node in the communication system along a second communication path after detection of a fault along a first communication path between the node to the another node.

9. The node of claim 1, further comprising a multiplexer operable to receive the first subset of wavelength signals from the express path and to combine the first subset of wavelength signals with at least one other subset of wavelength signals to form an output WDM signal.

10. A method of optical communication, comprising:
separating a first input wavelength division multiplexed (WDM) signal received from a first optical path into a first plurality of subsets of wavelength signals;
separating a second input WDM signal received from a second optical path into a second plurality of subsets of wavelength signals;
interchanging wavelength signals between particular subsets of wavelength signals associated with the first and second input WDM signals such that at least one wavelength signal from a particular subset of the first input WDM signal is communicated to the second optical path and at least one wavelength signal from a particular subset of the second input WDM signal is communicated to the first optical path;
wherein the wavelength signals interchanged between the first and second optical paths comprise different wavelengths, and further comprising converting one of the interchanged wavelength signals to approximately match the wavelength of the signal being interchanged.

11. A node in an optical communication system, the node comprising:
a first demultiplexer operable to receive a first input wavelength division multiplexed (WDM) signal from a first optical path coupled to then ode and to separate the first input WDM signal into a plurality of subsets of wavelength signals;
a second demultiplexer operable to receive a second input WDM signal from a second optical path coupled to the node and to separate the second input WDM signal into a plurality of subsets of wavelength signals;
wherein at least one of the first and second input WDM signals comprises a first beam and a second beam, and wherein the demultiplexer receiving the at least one signal comprises:
an optical filter operable to decompose the second beam into a fifth beam and a sixth beam;
wherein the third beam and the fifth beam carry the first subset of wavelength signals and the fourth beam and the sixth beam carry the second subset of wavelength signals; and
wherein the third beam and the sixth beam have a first polarization and the fourth beam and the fifth beam have a second polarization that is transverse to the first polarization; and
an optical cross connect operable to receive only particular subsets of wavelength signals from the first and second input WDM signals, and to interchange wavelength signals between the particular subsets such that at least one wavelength signal from the particular subset of first input WDM signal is communicated to the second optical path and at least one wavelength signal from the particular subset of second input WDM signals is communicated to the first optical path.

12. The node of claim 11, wherein the demultiplexer further comprises a birefringent element that combines the third beam and the fifth beam to form a first demultiplexed signal comprising the first subset of wavelength signals and combines the fourth beam and the sixth beam to form a second demultiplexed signal comprising the second subset of wavelength signals.

13. The node of claim 11, wherein the wavelength signals interchanged between the first and second optical paths comprise approximately the same wavelength.

14. The node of claim 11, further comprising an optical add/drop multiplexer operable to substitute one of a plurality of add signals for a selected one of the wavelength signals from the subsets of input wavelength signals.

15. A method of communicating optical signals, comprising:
receiving an input wavelength division multiplexed (WDM) signal comprising a plurality of wavelength signals;
separating the input WDM signal into at least a first subset of wavelength signals comprising a first plurality of wavelengths and a second subset of wavelength signals comprising a second plurality of wavelengths different from and interdigitally spaced among the first plurality of wavelengths;
communicating the first subset of wavelength signals using an express path without further processing;
communicating the second subset of wavelength signals using a processing path; and
performing a signal processing function on at least a portion of the second subset of wavelength signals, wherein performing a signal processing function comprises routing at least some of the second subset of wavelength signals for receipt by another node in the system without converting the at least some of the wavelength signals to an electrical format.

16. The method of claim 15, wherein performing the signal processing function comprises:
receiving at each of a plurality of input ports at least one wavelength signal from the second subset of wavelength signals;
receiving at each of a plurality of add ports at least one of a plurality of add signals;
for each input port, communicating either one of the wavelength signals from the second subset of wavelength signals or one of the add signals to an output port associated with the input port.

17. The method of claim 16, further comprising cross connecting one of the wavelength signals from the second subset of wavelength signals received at a first input port to an output port associated with a second input port.

18. The method of claim 15, wherein the input WDM signal comprises a first input WDM signal and wherein performing a signal processing function comprises:
receiving a third subset of wavelength signals associated with a second input WDM signal; and
substituting a wavelength signal from the second subset of wavelength signals with a wavelength signal from the third subset of wavelength signals.

19. The method of the claim 18, wherein the wavelength signal from the third subset substituted for the wavelength signal from the second subset comprises approximately the same wavelength as the wavelength signal from the second subset.

20. The method of claim 15, wherein performing a signal processing function comprises routing at least some of the second subset of wavelength signals using a protection path.

21. The method of claim 15, further comprising combining wavelength signals communicated using the express path with other wavelength signals to form an output WDM signal.

22. The method of claim 15, further comprising combining wavelength signals communicated using the processing path with other wavelength signals to form an output WDM signal.

23. A method of optical communication, comprising:
receiving a first input wavelength division multiplexed (WDM) signal comprising a first beam and a second beam;
filtering the first input WDM signal using an optical filter operable to decompose the first beam into a third beam and a fourth beam and to decompose the second beam into a fifth beam and a sixth beam, wherein the third beam and the fifth beam carry a first subset of wavelength signals and the fourth beam and the sixth beam carry a second subset of wavelength signals, wherein the third beam and the sixth beam have a first polarization and the fourth beam and the fifth beam have a second polarization that is transverse to the first polarization;
separating a second input WDM signal received from a second optical path into a plurality of subsets of wavelength signals;
interchanging wavelength signals between particular subsets of wavelength signals associated with the first and second input WDM signals such that at least one wavelength signal from a particular subset of the first input WDM signal is communicated to the second optical path and at least one wavelength signal from a particular subset of the second input WDM signal is communicated to the first optical path.

24. The method of claim 23, wherein interchanging wavelength signals is performed by an optical cross-connect.

25. The method of claim 24, wherein:
the particular subsets of wavelength signals are predetermined; and
the optical cross connect only receives wavelength signals from the predetermined subsets of wavelength signals.

26. The method of claim 23, further comprising:
combining the third beam and the fifth beam to form a first demultiplexed signal comprising the first subset of wavelength signals; and
combining the fourth beam and the sixth beam to form a second demultiplexed signal comprising the second subset of wavelength signals.

27. The method of claim 23, wherein the wavelength signals interchanged between the first and second optical paths comprise approximately the same wavelength.

28. The method of claim 23, wherein the wavelength signals interchanged between the first and second optical paths comprise different wavelengths, and further comprising converting one of the interchanged wavelength signals to approximately match the wavelength of the other interchanged wavelength signal.

29. The method of claim 23, further comprising substituting one of a plurality of add signals for at least one wavelength signal associated with the first input WDM signal or the second input WDM signal.

30. In an optical communication system comprising a plurality of optical paths, a node coupled to at least one of the optical paths, the node comprising
a demultiplexer operable to receive a WDM signal comprising a first beam and a second beam, wherein the demultiplexer comprises:
an optical filter operable to decompose the first beam into a third beam and a fourth beam and to decompose the second beam into a fifth beam and a sixth beam;

wherein the third beam and the fifth beam carry the first subset of wavelength signals and the fourth beam and the sixth beam carry the second subset of wavelength signals, and wherein the first and second pluralities of wavelength signals are processed differently depending on the wavelengths in each plurality of wavelength signals; and wherein the third beam and the sixth beam have a first polarization and the fourth beam and the fifth beam have a second polarization that is transverse to the first polarization;

an express path operable to receive from the demultiplexer the first subset of wavelength signals, and to pass those wavelength signals from the node without further processing; and a processing path operable to receive from the demultiplexer the second subset of wavelength signals such that those wavelength signals are processed within the node.

31. The node of claim 30, wherein the demultiplexer further comprises a birefringent element that combines the third beam and the fifth beam to form a first demultiplexed signal comprising the first subset of wavelength signals and combines the fourth beam and the sixth beam to form a second demultiplexed signal comprising the second subset of wavelength signals.

32. The node of claim 30, wherein the processing path comprises an optical add/drop multiplexer comprising:

a plurality of input ports each operable to receive a wavelength signal from the second subset; and a plurality of add ports each operable to receive one of a plurality of add signals;

wherein for each input port, the optical add/drop multiplexer is operable to selectively route either a wavelength signal or an add signal to a corresponding output port.

33. The node of claim 30, wherein the input WDM signal comprises a first input WDM signal and wherein the processing path comprises:

an optical cross connect operable to receive the second subset of wavelength signals of the first input WDM signal and to receive a third subset of wavelength signals of a second input WDM signal, the optical cross connect operable to selectively substitute a wavelength signal from the third subset for a wavelength signal of the second subset of wavelength signals.

34. The node of claim 33, wherein the wavelength signal from the third subset and the wavelength signal from the second subset comprise approximately the same wavelength.

35. The node of claim 33, wherein the wavelength signal from the third subset and the wavelength signal from the second subset comprise different wavelengths, and wherein the optical cross connect comprises a wavelength converter operable to convert the wavelength signal of the third subset to approximately match the wavelength of the wavelength signal of the second subset.

36. The node of claim 33, wherein the first input WDM signal was received by the node from a first optical path coupled to the node, and wherein the second input WDM signal was received by the node from a second optical path coupled to the node, wherein the optical cross connect is operable to interchange wavelength signals between the first and second paths coupled to the node.

37. The node of claim 30, wherein the processing path comprises a Synchronous Optical Network (SONET) router operable to electronically process and facilitate routing to other nodes in the communication system information carried by at least some of the second subset of wavelength signals.

38. The node of claim 30, wherein the processing path comprises an optical router operable to route at least some of the second subset of wavelength signals for receipt by another node in the communication system without converting the at least some of the second subset of wavelength signals to an electrical format.

39. The node of claim 30, further comprising a multiplexer operable to receive the second subset of wavelength signals from the processing path and to combine the second subset of wavelength signals with at least one other subset of wavelength signals to form an output WDM signal.

40. In an optical communication system comprising a plurality of optical paths, a node coupled to at least one of the optical paths, the node comprising:

a demultiplexer operable to receive a first input wavelength division multiplexed (WDM) signal and to separate the input WDM signal into at least a first subset of wavelength signals comprising a first plurality of wavelengths and a second subset of wavelength signals comprising a second plurality of wavelengths different from the first plurality of wavelengths, wherein the first and second pluralities of wavelength signals are processed differently depending on the wavelengths in each plurality of wavelength signals;

an express path operable to receive from the demultiplexer the first subset of wavelength signals, and to pass those wavelength signals from the node without further processing; and an optical cross connect operable to receive the second subset of wavelength signals of the first input WDM signal and to receive a third subset of wavelength signals of a second input WDM signal, the optical cross connect operable to selectively substitute a wavelength signal from the third subset for a wavelength signal of the second subset of wavelength signals;

wherein the wavelength signal from the third subset and the wavelength signal from the second subset comprise different wavelengths, and wherein the optical cross connect comprises a wavelength converter operable to convert the wavelength signal of the third subset to approximately match the wavelength of the wavelength signal of the second subset.

41. The node of claim 40, wherein the input WDM signal comprises a first beam and a second beam, and wherein the demultiplexer comprises:

a wavelength filter having a polarization dependent optical transmission function such that the first beam is processed into a third beam and a fourth beam and the second beam is processed into a fifth beam and a sixth beam;

wherein the third beam and the fifth beam carry the first subset of wavelength signals and the fourth beam and the sixth beam carry the second subset of wavelength signals; and wherein the third beam and the sixth beam have a first polarization and the fourth beam and the fifth beam have a second polarization that is transverse to the first polarization.

42. The node of claim 41, wherein the demultiplexer further comprises a birefringent element that combines the third beam and the fifth beam to form a first demultiplexed signal comprising the first subset of wavelength signals and combines the fourth beam and the sixth beam to form a second demultiplexed signal comprising the second subset of wavelength signals.

43. The node of claim 40, wherein the optical cross connect comprises a Synchronous Optical Network (SONET) cross connect operable to electronically process and facilitate routing to other nodes in the communication system information carried by at least some of the second subset of wavelength signals.

44. The node of claim 40, wherein the cross connect comprises an optical cross connect operable to route at least some of the second subset of wavelength signals for receipt by another node in the communication system without converting the at least some of the second subset of wavelength signals to an electrical format.

45. The node of claim 40, further comprising a multiplexer operable to receive at least a portion of the second subset of wavelength signals from the processing path and to combine the at least a portion of the second subset of wavelength signals with at least one other subset of wavelength signals to form an output WDM signal.

46. In an optical communication system comprising a plurality of optical paths, a node coupled to at least one of the optical paths, the node comprising:
   a demultiplexer operable to receive an input wavelength division multiplexed (WDM) signal and to separate the input WDM signal into at least a first subset of wavelength signals comprising a first plurality of wavelengths and a second subset of wavelength signals comprising a second plurality of wavelengths different from the first plurality of wavelengths, wherein the first and second pluralities of wavelength signals are processed differently depending on the wavelengths in each plurality of wavelength signals;
   an express path operable to receive from the demultiplexer the first subset of wavelength signals, and to pass those wavelength signals from the node without further processing; and
   a processing path operable to receive from the demultiplexer the second subset of wavelength signals, the processing path comprising:
      a protection path operable to facilitate routing at least some of the second subset of wavelength signals to another node in the communication system along a second communication path after detection of a fault along a first communication path between the node to the another node;
      wherein the second subset of wavelength signals comprises a traffic subset and a protection subset, and wherein the node is operable to dynamically allocate wavelength signals between the traffic subset and the protection subset.

47. The node of claim 46, wherein the input WDM signal comprises a first beam and a second beam, and wherein the demultiplexer comprises:
   a wavelength filter having a polarization dependent optical transmission function such that the first beam is processed into a third beam and a fourth beam and the second beam is processed into a fifth beam and a sixth beam;
   wherein the third beam and the fifth beam carry the first subset of wavelength signals and the fourth beam and the sixth beam carry the second subset of wavelength signals; and
   wherein the third beam and the sixth beam have a first polarization and the fourth beam and the fifth beam have a second polarization that is transverse to the first polarization.

48. The node of claim 47, wherein the demultiplexer further comprises a birefringent element that combines the third beam and the fifth beam to form a first demultiplexed signal comprising the first subset of wavelength signals and combines the fourth beam and the sixth beam to form a second demultiplexed signal comprising the second subset of wavelength signals.

49. The node of claim 46, wherein the processing path comprises an optical add/drop multiplexer comprising:
   a plurality of input ports each operable to receive a wavelength signal from the second subset; and
   a plurality of add ports each operable to receive one of a plurality of add signals;
   wherein for each input port, the optical add/drop multiplexer is operable to selectively route either a wavelength signal or an add signal to a corresponding output port.

50. The node of claim 46, wherein the input WDM signal comprises a first input WDM signal and wherein the processing path comprises:
   an optical cross connect operable to receive the second subset of wavelength signals of the first input WDM signal and to receive a third subset of wavelength signals of a second input WDM signal, the optical cross connect operable to selectively substitute a wavelength signal from the third subset for a wavelength signal of the second subset of wavelength signals.

51. The node of claim 50, wherein the wavelength signal from the third subset and the wavelength signal from the second subset comprise approximately the same wavelength.

52. The node of claim 51, wherein the wavelength signal from the third subset and the wavelength signal from the second subset comprise different wavelengths, and wherein the optical cross connect comprises a wavelength converter operable to convert the wavelength signal of the third subset to approximately match the wavelength of the wavelength signal of the second subset.

53. The node of claim 50, wherein the first input WDM signal was received by the node from a first optical path coupled to the node, and wherein the second input WDM signal was received by the node from a second optical path coupled to the node, wherein optical cross connect is operable to interchange wavelength signals between the first and second paths coupled to the node.

54. The node of claim 46, wherein the processing path comprises a Synchronous Optical Network (SONET) router operable to electronically process and facilitate routing to other nodes in the communication system information carried by at least some of the second subset of wavelength signals.

55. The node of claim 46, wherein the processing path comprises an optical router operable to route at least some of the second subset of wavelength signals for receipt by another node in the communication system without converting the at least some of the second subset of wavelength signals to an electrical format.

56. The node of claim 46, further comprising a multiplexer operable to receive at least a portion of the second subset of wavelength signals from the processing path and to combine the at least a portion of the of second subset of wavelength signals with at least one other subset of wavelength signals to form an output WDM signal.

57. A node in an optical communication system, the node comprising:
   a first demultiplexer operable to receive a first input wavelength division multiplexed (WDM) signal from a first optical path coupled to the node and to separate the first input WDM signal into a plurality of subsets of wavelength signals;

a second demultiplexer operable to receive a second input WDM signal from a second optical path coupled to the node and to separate the second input WDM signal into a plurality of subsets of wavelength signals; and an optical cross connect operable to receive only particular subsets of wavelength signals from the first and second input WDM signals, and to interchange wavelength signals between the particular subsets such that at least one wavelength signal from the particular subset of first input WDM signals is communicated to the second optical path and at least one wavelength signal from the particular subset of second input WDM signals is communicated to the first optical path;

wherein the wavelength signals interchanged between the first and second optical paths comprise different wavelengths, and wherein the optical cross connect comprises a wavelength converter operable to convert one of the interchanged wavelength signals to approximately match the wavelength of the other interchanged wavelength signal.

58. A method of communicating optical signals, comprising:

receiving an input wavelength division multiplexed (WDM) signal comprising a first beam and a second beam;

filtering the input WDM signal using an optical filter operable to decompose the first beam into a third beam and a fourth beam and to decompose the second beam into a fifth beam and a sixth beam, wherein the third beam and the fifth beam carry a first subset of wavelength signals and the fourth beam and the sixth beam carry a second subset of wavelength signals, and wherein the third beam and the sixth beam have a first polarization and the fourth beam and the fifth beam have a second polarization that is transverse to the first polarization;

communicating the first subset of wavelength signals using an express path without further processing;

communicating of the second subset of wavelength signals using a processing path; and performing a signal processing function on at least a portion of the second subset of wavelength signals.

59. The method of claim 58, further comprising:

combining the third beam and the fifth beam to form a first demultiplexed signal comprising the first subset of wavelength signals; and combining the fourth beam and the sixth beam to form a second demultiplexed signal comprising the second subset of wavelength signals.

60. The method of claim 58, wherein performing the signal processing function comprises:

receiving at each of a plurality of input ports at least one wavelength signal from the second subset of wavelength signals;

receiving at each of a plurality of add ports at least one of a plurality of add signals;

for each input port communicating either one of the wavelength signals from the second subset of wavelength signals or one of the add signals to an output port associated with the input port.

61. The method of claim 60, further comprising cross connecting one of the wavelength signals from the second subset of wavelength signals received at a first input port to an output port associated with a second input port.

62. The method of claim 58, wherein the input WDM signal comprises a first input WDM signal and wherein performing a signal processing function comprises:

receiving a third subset of wavelength signals associated with a second input WDM signal; and substituting a wavelength signal from the second subset of wavelength signals with a wavelength signal from the third subset of wavelength signals.

63. The method of claim 62, wherein the wavelength signal from the third subset substituted for the wavelength signal from the second subset comprises approximately the same wavelength as the wavelength signal from the second subset.

64. The method of claim 62, wherein the wavelength signal from the third subset substituted for the wavelength signal from the second subset initially comprises a different wavelength from the wavelength signal from the second subset, and further comprising:

converting the wavelength of the wavelength signal from the third subset to at least approximately match the wavelength of the wavelength signal from the second subset.

65. The method of claim 62, wherein performing a signal processing function comprises routing at least some of the second subset of wavelength signals for receipt by another node in the system without converting the at least some of the wavelength signals to an electrical format.

66. The method of claim 62, wherein performing a signal processing function comprises routing at least some of the second subset of wavelength signals using a protection path.

67. The method of claim 62, further comprising combining wavelength signals communicated using the express path with other wavelength signals to form an output WDM signal.

68. The method of claim 62, further comprising combining wavelength signals communicated using the processing path with other wavelength signals to form an output WDM signal.

69. A method of communicating optical signals, comprising:

receiving a first input wavelength division multiplexed (WDM) signal comprising a plurality of wavelength signals;

separating the input WDM signal into at least a first subset of wavelength signals comprising a first plurality of wavelengths and a second subset of wavelength signals comprising a second plurality of wavelengths different from the first plurality of wavelengths;

communicating the first subset of wavelength signals using an express path without further processing;

receiving a third subset of wavelength signals associated with a second input WDM signal;

converting the wavelength of a wavelength signal from the third subset to at least approximately match a wavelength of a selected one of the wavelength signals from the second subset; and substituting the converted wavelength signal from the subset of wavelength signals with the selected one of the wavelength signals from the second subset of wavelength signals.

70. A method of communicating optical signals, comprising:

receiving an input wavelength division multiplexed (WDM) signal comprising a plurality of wavelength signals;

separating the input WDM signal into at least a first subset of wavelength signals comprising a first plurality of wavelengths and a second subset of wavelength signals comprising a second plurality of wavelengths different from the first plurality of wavelengths, wherein the second subset of wavelength signals comprises a traffic subset and a protection subset;

communicating the first subset of wavelength signals using an express path without further processing;

communicating of the second subset of wavelength signals using a processing path; and performing a signal processing function on at least a portion of the second subset of wavelength signals, the signal processing function comprising:

routing at least some of the second subset of wavelength signals to another node in the communication system along a second communication path after detection of a fault along a first communication path between the node to the another node; and dynamically allocating wavelength signals between the traffic subset and the protection subset.

71. The method of claim 70, wherein separating the input WDM signal into at least a first subset of wavelength signals comprising a first plurality of wavelengths and a second subset of wavelength signals comprising a second plurality of wavelengths different from the first plurality of wavelengths comprises:

filtering the input WDM signal using an optical filter operable to decompose the first beam into a third beam and a fourth beam and to decompose the second beam into a fifth beam and a sixth beam, wherewith third beam and the fifth beam carry a first subset of wavelength signals and the fourth beam and the sixth beam carry a second subset of wavelength signals, and wherein the third beam and the sixth beam have a first polarization and the fourth beam and the fifth beam have a second polarization that is transverse to the first polarization.

72. The method of claim 71, further comprising:

combining the third beam and the fifth beam to form a first demultiplexed signal comprising the first subset of wavelength signals; and combining the fourth beam and the sixth beam to form a second demultiplexed signal comprising the second subset of wavelength signals.

73. The method of claim 70, wherein performing the signal processing function comprises:

receiving at each of a plurality of input ports at least one wavelength signal from the second subset of wavelength signals;

receiving at each of a plurality of add ports at least one of a plurality of add signals;

for each input port, communicating either one of the wavelength signals from the second subset of wavelength signals or one of the add signals to an output port associated with the input port.

74. The method of claim 70, wherein performing the signal processing function comprises cross connecting one of the wavelength signals from the second subset of wavelength signals received at a first input port to an output port associated with a second input port.

75. The method of claim 70, wherein the input WDM signal comprises a first input WDM signal and wherein performing a signal processing function comprises:

receiving a third subset of wavelength signals associated with a second input WDM signal; and substituting a wavelength signal from the second subset of wavelength signals with a wavelength signal from the third subset of wavelength signals.

76. The method of claim 75, wherein the wavelength signal from the third subset substituted for the wavelength signal from the second subset comprises approximately the same wavelength as the wavelength signal from the second subset.

77. The method of claim 70, wherein performing the signal processing function comprises:

receiving a first input wavelength division multiplexed (WDM) signal comprising a plurality of wavelength signals;

separating the input WDM signal into at least a first subset of wavelength signals comprising a first plurality of wavelengths and a second subset of wavelength signals comprising a second plurality of wavelengths different from the first plurality of wavelengths;

communicating the first subset of wavelength signals using an express path without further processing;

receiving a third subset of wavelength signals associated with a second input WDM signal;

converting the wavelength of a wavelength signal from the third subset to at least approximately match a wavelength of a selected one of the wavelength signals from the second subset; and substituting the converted wavelength signal from the third subset of wavelength signals with the selected one of the wavelength signals from the second subset of wavelength signals.

78. The method of claim 70, wherein performing a signal processing function comprises routing at least some of the second subset of wavelength signals for receipt by another node in the system without converting the at least some of the wavelength signals to an electrical format.

79. The method of claim 70, further comprising combining wavelength signals communicated using the express path with other wavelength signals to form an output WDM signal.

80. The method of claim 70, further comprising combining wavelength signals communicated using the processing path with other wavelength signals to form an output WDM signal.

* * * * *